(12) United States Patent
Kang et al.

(10) Patent No.: US 10,021,388 B2
(45) Date of Patent: Jul. 10, 2018

(54) VIDEO ENCODING AND DECODING METHOD AND APPARATUS USING THE SAME

(71) Applicant: ELECTRONICS AND TELECOMMUNICATIONS RESEARCH INSTITUTE, Daejeon (KR)

(72) Inventors: Jung Won Kang, Daejeon-si (KR); Ha Hyun Lee, Seoul (KR); Jin Ho Lee, Daejeon-si (KR); Jin Soo Choi, Daejeon-si (KR); Jin Woong Kim, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 374 days.

(21) Appl. No.: 14/139,901

(22) Filed: Dec. 24, 2013

(65) Prior Publication Data

US 2014/0177711 A1    Jun. 26, 2014

(30) Foreign Application Priority Data

Dec. 26, 2012   (KR) ................ 10-2012-0153422
Apr. 12, 2013   (KR) ................ 10-2013-0040659
Dec. 24, 2013   (KR) ................ 10-2013-0162757

(51) Int. Cl.
| | |
|---|---|
| *H04N 19/50* | (2014.01) |
| *H04N 19/91* | (2014.01) |
| *H04N 19/597* | (2014.01) |
| *H04N 19/30* | (2014.01) |

(52) U.S. Cl.
CPC ....... *H04N 19/00951* (2013.01); *H04N 19/30* (2014.11); *H04N 19/597* (2014.11)

(58) Field of Classification Search
CPC . H04N 19/00951; H04N 19/30; H04N 19/597
USPC ...................................... 375/240.12
See application file for complete search history.

(56) References Cited

U.S. PATENT DOCUMENTS

| | | | | |
|---|---|---|---|---|
| 8,711,948 | B2 * | 4/2014 | Tu ......................... | H04N 19/30 375/240.13 |
| 8,854,427 | B2 * | 10/2014 | Bruls ................... | H04N 19/597 345/32 |
| 2006/0251169 | A1 * | 11/2006 | Wang ................... | H04N 19/105 375/240.12 |
| 2007/0033494 | A1 * | 2/2007 | Wenger ............... | H04N 19/147 714/776 |

(Continued)

*Primary Examiner* — Deirdre Beasley
(74) *Attorney, Agent, or Firm* — NSIP Law

(57) ABSTRACT

Disclosed is technology associated with video encoding and decoding having a structure including one or more layers (quality, spatial, and view) and technology associated with a method that predicts an higher layer signal by using one or more reference layers in encoding and decoding an higher layer. In more detail, an interlayer prediction is capable of being performed by considering a characteristic of each layer by separating a spatial and quality reference layer list constituted by spatial and quality layers to be referred at the same view as a target layer and a view reference layer list constituted by the same spatial and quality layers as a target layer in encoding and decoding encoding and decoding pictures of an higher layer in encoding and decoding encoded and decoded pictures of the higher layer to improve encoding and decoding efficiency.

19 Claims, 8 Drawing Sheets

(56) References Cited

U.S. PATENT DOCUMENTS

| | | | | |
|---|---|---|---|---|
| 2007/0230564 A1* | 10/2007 | Chen | H04N 21/234327 | 375/240.01 |
| 2008/0089411 A1* | 4/2008 | Wenger | H04N 19/105 | 375/240.12 |
| 2010/0020871 A1* | 1/2010 | Hannuksela | H04N 21/438 | 375/240.12 |
| 2010/0272174 A1* | 10/2010 | Toma | H04N 19/426 | 375/240.12 |
| 2011/0274180 A1* | 11/2011 | Lee | H04N 19/30 | 375/240.25 |
| 2012/0075436 A1* | 3/2012 | Chen | H04N 13/0048 | 348/51 |
| 2012/0076204 A1* | 3/2012 | Raveendran | H04N 21/234327 | 375/240.12 |
| 2012/0268558 A1* | 10/2012 | Choi | H04N 19/597 | 348/42 |
| 2012/0269267 A1* | 10/2012 | Choi | H04N 19/597 | 375/240.13 |
| 2012/0269275 A1* | 10/2012 | Hannuksela | H04N 13/0048 | 375/240.25 |
| 2012/0314027 A1* | 12/2012 | Tian | H04N 7/181 | 348/43 |
| 2013/0070841 A1* | 3/2013 | Wahadaniah | H04N 19/115 | 375/240.02 |
| 2013/0108181 A1* | 5/2013 | Wey | H04N 19/30 | 382/233 |
| 2013/0156101 A1* | 6/2013 | Lu | H04N 19/30 | 375/240.12 |
| 2013/0163670 A1* | 6/2013 | Cherif | H04N 19/597 | 375/240.16 |
| 2013/0182073 A1* | 7/2013 | Yin | H04N 13/0048 | 348/43 |
| 2013/0222539 A1* | 8/2013 | Pahalawatta | H04N 13/0048 | 348/43 |
| 2013/0271571 A1* | 10/2013 | Wu | H04N 13/0048 | 348/43 |
| 2014/0092988 A1* | 4/2014 | Deshpande | H04N 19/70 | 375/240.26 |
| 2014/0169449 A1* | 6/2014 | Samuelsson | H04N 19/00024 | 375/240.02 |
| 2014/0169466 A1* | 6/2014 | Liu | H04N 19/593 | 375/240.12 |
| 2014/0198842 A1* | 7/2014 | He | H04N 19/597 | 375/240.03 |
| 2014/0205015 A1* | 7/2014 | Rusert | H04N 19/00769 | 375/240.16 |
| 2014/0218473 A1* | 8/2014 | Hannuksela | H04N 19/597 | 348/43 |
| 2014/0219338 A1* | 8/2014 | Komiya | H04N 19/00321 | 375/240.02 |
| 2014/0286433 A1* | 9/2014 | He | H04N 19/00696 | 375/240.16 |
| 2014/0348232 A1* | 11/2014 | Leontaris | H04N 19/597 | 375/240.12 |

* cited by examiner

VIDEO ENCODING AND DECODING METHOD AND APPARATUS USING THE SAME

This application claims the benefit of priority of Korean Patent Applications No. 10-2012-0153422 filed on Dec. 26, 2012, No. 10-2013-0040659 filed on Apr. 12, 2013 and No. 10-2013-0162757 filed on Dec. 24, 2013, which is incorporated by reference in its entirety herein.

BACKGROUND OF THE INVENTION

Field of the Invention

The present invention relates video encoding and decoding processing, and more particularly, to an interlayer video encoding/decoding method adopting multiple reference layers in hierarchical video encoding and an apparatus thereof.

Discussion of the Related Art

Recently, as a broadcasting service having high definition (HD) resolution has been nationally and globally expanded, many users have been accustomed to high-resolution and high-definition videos, and as a result, many authorities spur the development of next-generation video devices. Further, as the interest for an HDTV and ultra high definition (UHD) having four times or more resolution is increased, a compression technique for higher-resolution and higher-definition videos has been required.

For video compression, an inter-prediction technique for predicting a pixel value included in a current picture from a previous and/or subsequent picture, an intra-prediction technique for predicting a pixel value included in a current picture by using pixel information in the current picture, an entropy coding technique for allocating a short code to a symbol having a high frequency and allocating a long code to a symbol having a low frequency, and the like may be used.

In the video compression technique, a technique of providing a constant network bandwidth under a limited operational environment of hardware without considering a flexible network environment is included. However, in order to compress video data applied to a network environment in which the bandwidth are frequently changed, a new compression technique is required, and to this end, a scalable video encoding/decoding method may be used.

SUMMARY OF THE INVENTION

An object of the preset invention is to provide video encoding and decoding methods that can perform an interlayer prediction by considering a characteristic of each layer by separating a spatial and quality reference layer list constituted by spatial and quality layers to be referred at the same view as a target layer and a view reference layer list constituted by the same spatial and quality layers as the target layer in encoding and decoding pictures of an higher layer, and an apparatus using the same.

Therefore, encoding efficiency can be improved.

of the present invention, a video decoding method supporting a plurality of layers may include: constructing a reference layer list which a picture of a target layer as a current decoding target is capable of referring to; constructing a reference picture list including a decoded picture of a view reference layer for an inter-picture prediction of the picture of the target layer; and predicting and decoding the picture of the target layer by the unit of a block by referring to the reference picture list.

The constructing of the reference layer list may include constructing a spatial and quality reference layer list and the view reference layer list, which the same layer as the target layer is capable of referring to, viewing entire bit stream.

The spatial and quality reference layer list may be constituted by layers having the same view as the target layer.

Meanwhile, the view reference layer list may be constituted by layers having the same spatial and quality as the target layer.

The constructing of the reference picture list may include configuring a first set including a decoded picture of the view reference layer; configuring a second set constituted by pictures on the same layer as the picture of the target layer; and combining the first set and the second set.

The first set may be considered as long-term reference pictures.

The pictures included in the first set may be added to any one of a first, second, and last position of the reference picture list.

In the predicting and decoding of the picture by the unit of the block, the spatial and quality reference layer may be referred, and the predicting and decoding of the picture by the unit of the block may include determining a reference layer used to decode a current decoding target block in the spatial and quality reference layer list; determining a reference block corresponding to the target block in the determined spatial and quality reference layer; and decoding the target block by using at least one of a reconstruction sample of the reference block, a residual of the reference block, encoding parameters of the reference block.

In the predicting and decoding of the picture by the unit of the block, the inter-picture prediction for the current decoding target block may be performed by using the reference picture within the reference picture list.

In accordance with another embodiment of the present invention, a video decoding apparatus supporting a plurality of layers may include: an entropy-decoding module decoding information for predicting and decoding a picture received through a bit stream; and a prediction module constructing a reference layer list which a reference layer list which a picture of a target layer as a current decoding target is capable of referring to, constructing a reference picture list including a decoded picture of a view reference layer for an inter-picturepicture prediction of the picture of the target layer, and predicting and decoding the picture of the target layer by referring to the reference picture list.

According to embodiments of the present invention, there are provided video encoding and decoding methods that can perform an interlayer prediction by considering a characteristic of each layer by separating a spatial and quality reference layer list constituted by spatial and quality layers to be referred at the same view as a target layer and a view reference layer list constituted by the same spatial and quality layers as the target layer in encoding and decoding pictures of an higher layer, and an apparatus using the same.

As a result, there are provided video encoding/decoding method and apparatus that can video encoding/decoding efficiency.

DETAILED DESCRIPTION OF THE EMBODIMENTS

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

In this specification, when it is said that one element is 'connected' or 'coupled' with the other element, it may mean that the one element may be directly connected or coupled with the other element and a third element may be 'connected' or 'coupled' between the two elements. Furthermore, in this specification, when it is said that a specific element is 'included', it may mean that elements other than the specific element are not excluded and that additional elements may be included in the embodiments of the present invention or the scope of the technical spirit of the present invention.

Terms, such as the first and the second, may be used to describe various elements, but the elements are not restricted by the terms. The terms are used to only distinguish one element from the other element. For example, a first element may be named a second element without departing from the scope of the present invention. Likewise, a second element may be named a first element.

Further, components described in the embodiments of the present invention are independently illustrated in order to show different characteristic functions and each component is not constituted by separated hardware or one software constituting unit. That is, each component includes the respective components that are arranged for easy description, and at least two components among the respective components are combined to form one component or one component is divided into a plurality of components to perform its function, and integrated exemplary embodiments and separated exemplary embodiments of each component are also included in the scope of the present invention without departing from the spirit of the present invention.

Further, some components are not requisite components that perform essential functions but selective components for just improving performance in the present invention. The present invention may be implemented by only components required to implement the spirit of the present invention other than components used for performance improvement and a structure including only required components other than optional components just used for performance improvement is also included in the scope of the present invention.

Figure 1:
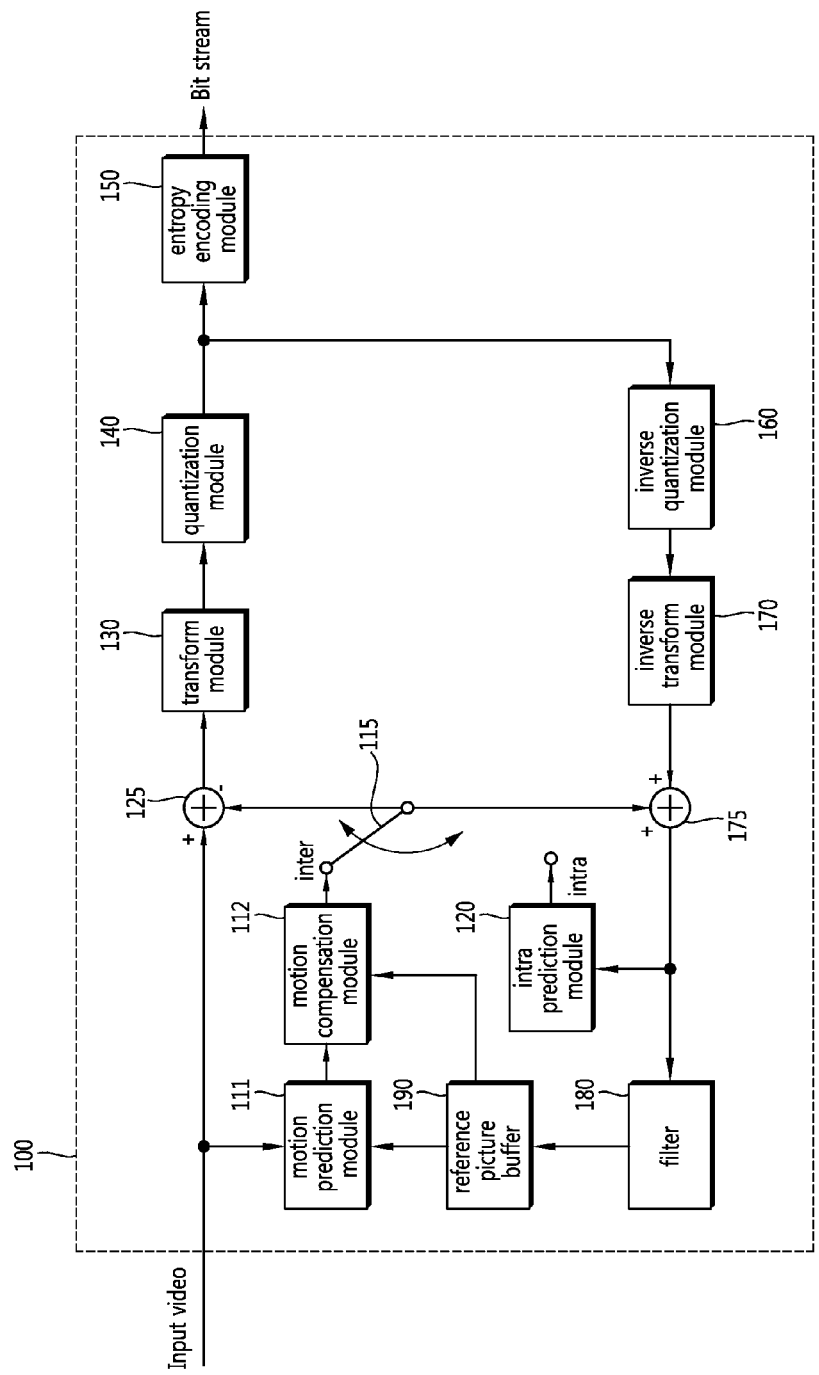
FIG. 1 is a block diagram illustrating a configuration of a video encoding apparatus according to an embodiment of the present invention.

FIG. 1 is a block diagram illustrating a configuration of a video encoding apparatus according to an embodiment of the present invention. A scalable video encoding/decoding method or apparatus may be implemented by extension of a general video encoding/decoding method or apparatus without providing scalability, and the block diagram of FIG. 1 illustrates an embodiment of a video encoding apparatus which may form a basis of a scalable video encoding apparatus.

Referring to FIG. 1, the video encoding apparatus 100 includes a motion estimation module 111, a motion compensation module 112, an intra prediction module 120, a switch 115, a subtractor 125, a transformation module 130, a quantization module 140, an entropy encoding module 150, an inverse quantization module 160, an inverse transformation module 170, an adder 175, a filter module 180, and a reference picture buffer 190.

The video encoding apparatus 100 may encode an input picture in an intra mode or an inter mode and output a bit stream. The intra prediction means an intra-picture prediction, and the inter prediction means an inter-picture prediction. In the intra mode, the switch 115 is shifted to 'intra', and in the inter mode, the switch 115 is shifted to 'inter'. The video encoding apparatus 100 may generate a prediction block for an input block of the input picture, and then encode a difference between the input block and the prediction block.

In the case of the intra mode, the intra prediction module 120 performs a spatial prediction by using a pixel value of a pre-encoded block around a current block to generate a prediction block.

In the case of the inter mode, the motion estimation module 111 may find a region which is best matched with the input block in the reference picture stored in the reference picture buffer 190 during the motion estimation process. The motion compensation module 112 compensates for the motion by using the motion vector and the reference picture stored in the reference picture buffer 190 to generate the prediction block.

The subtractor 125 may generate a residual block by the difference between the input block and the generated prediction block. The transformation module 130 performs transform for the residual block to output a transform coefficient. In addition, the quantization module 140 quantizes the input transform coefficient according to a quantization parameter to output a quantized coefficient.

The entropy encoding module 150 may entropy-encode a symbol according to probability distribution to output a bit stream, based on values calculated by the quantization module 140 or an encoding parameter value and the like calculated during the encoding process. The entropy encoding method is a method in which symbols having various values are received and expressed by decodable binary strings while removing statistical redundancy.

Here, the symbol means a syntax element to be encoded/decoded, a coding parameter, a value of a residual signal, and the like. The coding parameter is a parameter required for encoding and decoding, and may include information encoded in the encoding apparatus to be transferred to the decoding apparatus like the syntax element and information to be inferred during the encoding or decoding process, and means information required when encoding and decoding the picture. For example, the coding parameter may include values or statistics of an intra/inter-prediction mode, a movement/motion vector, a reference picture index, a coding block pattern, presence of a residual signal, a transform coefficient, a quantized transform coefficient, a quantized parameter, a block size, block division information, and the like. Further, the residual signal may mean a difference between an original signal and a prediction signal, and further, may also mean a signal in which the difference between the original signal and the prediction signal is transformed, or a signal in which the difference between the original signal and the prediction signal is transformed and quantized. The residual signal may be referred to as a residual block in a block unit.

In the case of applying the entropy encoding, a few of bits are allocated to a symbol having high occurrence probability, and a lot of bits are allocated to a symbol having low occurrence probability to express the symbol, and as a result, a size of bit steams for symbols to be encoded may be reduced. Accordingly, compression performance of video encoding may be enhanced through the entropy encoding.

For the entropy encoding, encoding methods, such as exponential golomb, context-adaptive variable length coding (CAVLC), and context-adaptive binary arithmetic coding (CABAC), may be used. For example, a table for performing the entropy encoding such as a variable length coding/code (VLC) table may be stored in the entropy encoding module 150, and the entropy encoding module 150 may perform the entropy encoding by using the stored VLC table. Further, the entropy encoding module 150 deducts a binarization method of a target symbol and a probability model of a target symbol/bin, and then may also perform the entropy encoding by using the deducted binarization method or probability model.

The quantized coefficient may be inversely quantized in the inverse quantization module 160 and inversely transformed in the inverse transform module 170. The inversely quantized and inversely transformed coefficient is added to the prediction block by the adder 175 to generate a reconstructed block.

The reconstructed block passes though the filter module 180, and the filter module 180 may apply at least one of a deblocking filter, a sample adaptive offset (SAO), and an adaptive loop filter (ALF) to the reconstructed block or a reconstructed picture. The reconstructed block passing through the filter module 180 may be stored in the reference picture buffer 190.

Figure 2:
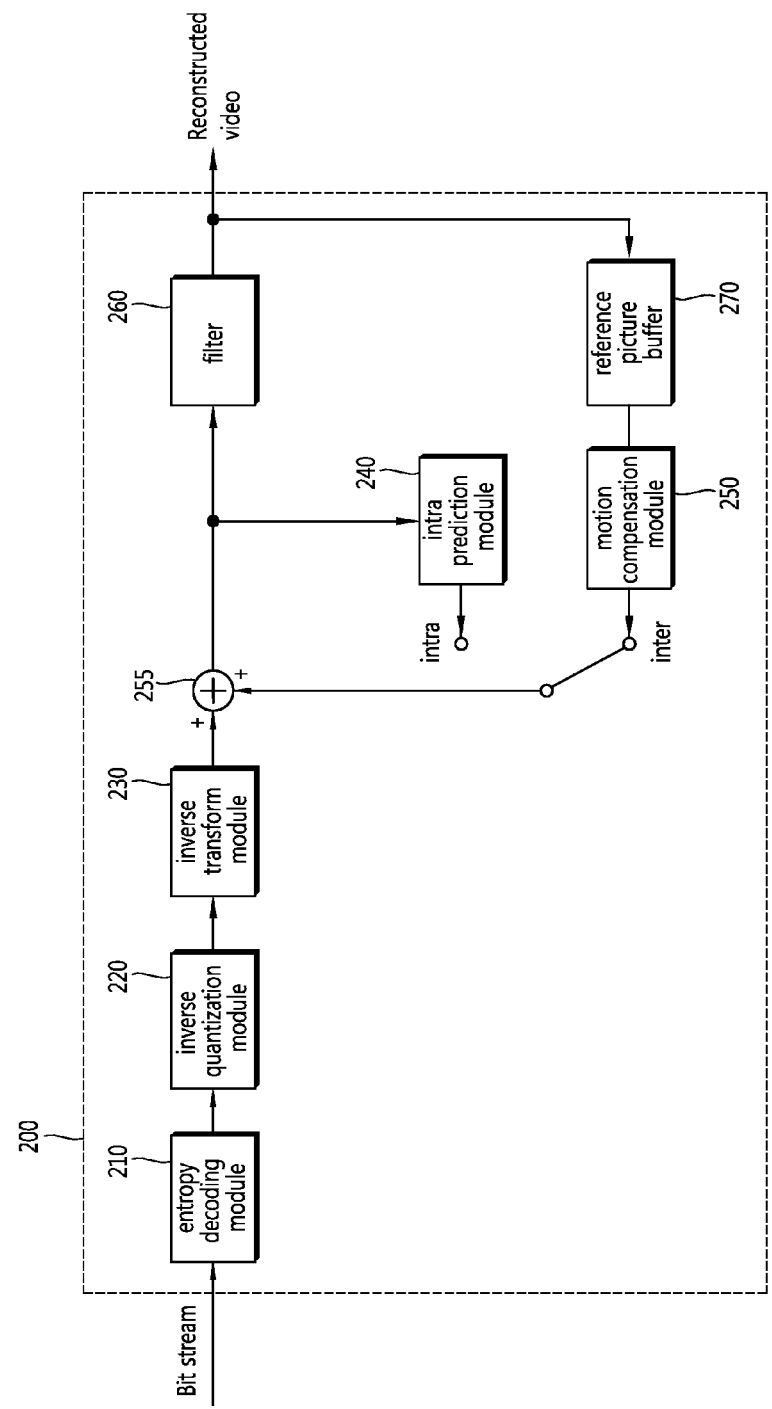
FIG. 2 is a block diagram illustrating a configuration of a video decoding apparatus according to an embodiment of the present invention.

FIG. 2 is a block diagram illustrating a configuration of a video decoding apparatus according to an embodiment of the present invention. As above-described in FIG. 1, a scalable video encoding/decoding method or apparatus may be implemented by extension of a general video encoding/decoding method or apparatus without providing scalability, and the block diagram of FIG. 2 illustrates an embodiment of a video decoding apparatus which may form a basis of a scalable video encoding apparatus.

Referring to FIG. 2, the image decoding apparatus 200 includes an entropy-decoding module 210, an inverse quantization module 220, an inverse transformation module 230, an intra prediction module 240, a motion compensating module 250, an adder 255, a filter module 260, and a reference picture buffer 270.

The video decoding apparatus 200 receives a bit stream output from the encoding apparatus to perform decoding in an inter mode or an inter mode and output a reconfigured video, that is, a reconstructed video. In the case of the intra mode, the switch may be shifted to 'intra', and in the case of the inter mode, the switch may be shifted to 'inter'. The video decoding apparatus 200 may acquire a residual block reconstructed from the input bit stream and generate a prediction block, and then generate a reconfigured block, that is, a reconstructed block by adding the reconstructed residual block and the prediction block.

The entropy decoding module 210 entropy-decodes the input bit stream according to probability distribution to generate symbols including a symbol having a quantized coefficient form. The entropy decoding method is a method of receiving binary strings to generate respective symbols. The entropy decoding method is similar to the aforementioned entropy encoding method.

The quantized coefficient is inversely quantized in the inverse quantization module 220 and inversely transformed in the inverse transform module 230, and as a result, when the quantized coefficient is inversely quantized and inversely transformed, a reconstructed residual block may be generated.

In the case of the intra mode, the intra prediction module 240 performs a spatial prediction by using a pixel value of a pre-encoded block around a current block to generate a prediction block. In the inter mode, the motion compensating module 250 compensates for a motion by using a motion vector and a reference picture stored in the reference picture buffer 270 to generate the prediction block.

The reconstructed residual block and the prediction block are added through the adder 255, and the added blocks pass through the filter module 260. The filter module 260 may apply at least one of a deblocking filter, an SAO, and an ALF to the reconstructed block or the reconstructed picture. The filter module 260 outputs the reconfigured picture, that is, the reconstructed picture. The reconstructed picture may be stored in the reference picture buffer 270 to be used for prediction between pictures.

The constituent elements directly related to the picture decoding among the entropy decoding module 210, the inverse quantization module 220, the inverse transform unit 230, the intra prediction module 240, the motion compensation module 250, the filter module 260, and the reference picture buffer 270 included in the video decoding apparatus 200, for example, the entropy decoding module 210, the inverse quantization module 220, the inverse transform module 230, the intra prediction module 240, the motion compensation module 250, the filter module 260, and the like are distinguished from other constituent elements to be expressed by the decoding module.

Further, the video decoding apparatus 200 may further include a parsing module (not illustrated) parsing information regarding the encoded picture included in the bit stream. The parsing module may include the entropy decoding module 210, and may also be included in the entropy decoding module 210. The parsing module may be further implemented as one constituent element of the decoding module.

Figure 3:
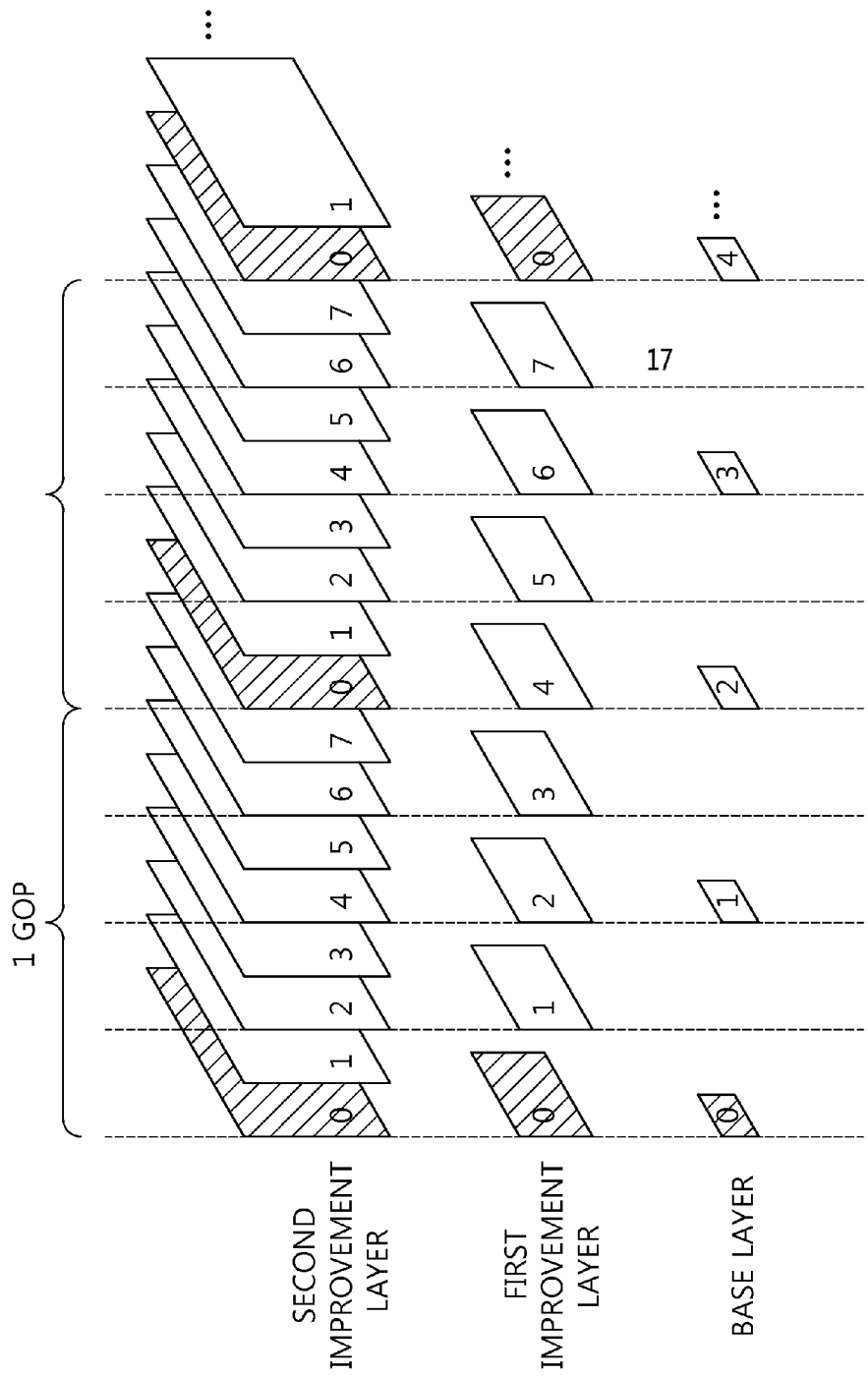
FIG. 3 is a conceptual diagram schematically illustrating a scalable video coding structure using a plurality of layers according to an embodiment of the present invention.

FIG. 3 is a conceptual diagram schematically illustrating a scalable video coding structure using a plurality of layers according to an embodiment of the present invention. In FIG. 3, a group of picture (GOP) represents a picture group, that is, a group of pictures.

In order to transmit the video data, a transmission medium is required, and performance thereof is different for each transmission medium according to various network environments. For application to various transmission media or network environments, the scalable video coding method may be provided.

The scalable video coding method is a coding method in which redundancy between layers is removed by using texture information, motion information, a residual signal between the layers, and the like to improve encoding/decoding performance. The scalable video coding method may provide various scalabilities in spatial, temporal, and quality aspects, according to ambient conditions such as a transmission bit rate, a transmission error rate, and a system resource.

The scalable video coding may be performed by using a multiple layers structure so as to provide a bit stream which can be applied to various network situations. For example, the scalable video coding structure may include a basic layer of compressing and processing the picture data by using a general video encoding method, and my include an enhanced layer of compressing and processing the picture data by using coding information of the basic layer and the general video encoding method.

Herein, a layer means a set of images and bit streams that are distinguished based on a spatial (for example, an image size), a time (for example, an encoding order, an image output order, and frame rate), image quality, complexity, and the like. Further, the basic layer may mean a lower layer, a reference layer, or a base layer, and the enhanced layer may mean an higher layer, and an enhancement layer. Further, the plurality of layers may have dependency between the layers.

Referring to FIG. 3, for example, the base layer may be defined by standard definition (SD), 15 Hz frame rate, and 1 Mbps bit rate, a first enhancement layer may be defined by high definition (HD), 30 Hz frame rate, and 3.9 Mbps bit rate, and a second enhancement layer may be defined by 4K-ultra high definition (UHD), 60 Hz frame rate, and 27.2 Mbps. The format, the frame rate, the bit rate, and the like may vary if necessary, as one embodiment. Further, the number of used layers is not limited to the embodiment, but may vary according to a situation.

For example, when the transmission bandwidth is 4 Mbps, the frame rate of the first enhancement layer HD is reduced to be transmitted at 15 Hz or less. The scalable video coding method may provide spatial, temporal, and quality scalabilities by the method described in the embodiment of FIG. 3.

In the case of the video encoding and decoding supporting the plurality of layers in the bit stream, that is, the scalable coding, since there is a strong correlation among the plurality of layers, the prediction is performed by using the correction to remove redundant elements of the data and improve encoding performance of the video. Performing prediction of a current layer to be predicted by using information of other layers is hereinafter expressed as inter-layer prediction. Hereinafter, the scalable video coding means a scalable video encoding in terms of encoding, and has the same mean as the scalable video decoding in terms of decoding.

In the plurality of layers, at least one of resolution, a frame rate, and a color format may be different from each other, and during the inter-layer prediction, up-sampling and down-sampling of the layers may be performed in order to control the resolution.

Figure 4:
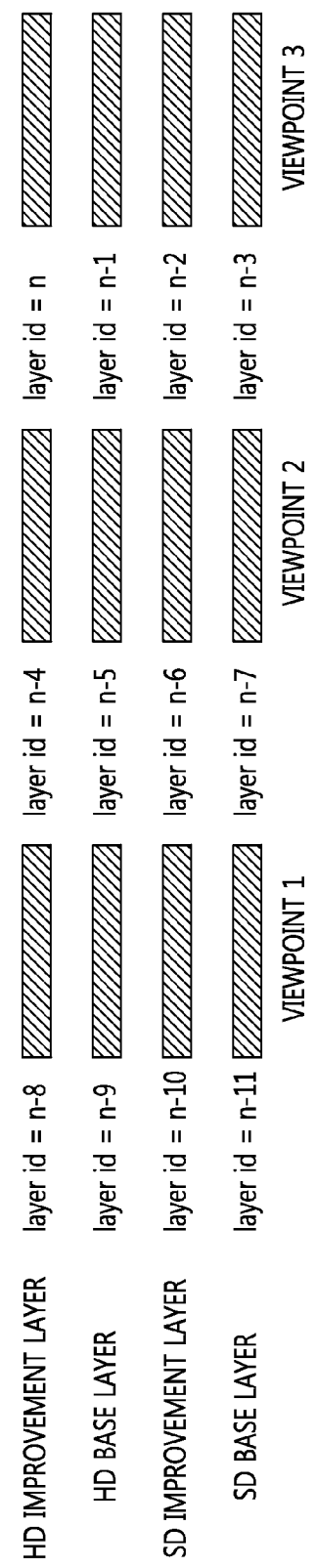
FIG. 4 is a conceptual diagram schematically illustrating spatial, quality and view layer according to an embodiment of the present invention.

FIG. 4 is a conceptual diagram schematically illustrating spatial, quality, and view layers according to an embodiment of the present invention.

As illustrated, the bit stream may include a plurality of layers.

The bit stream may include a plurality of view layers (view 1, view 2, and view 3) for different views, which are the same in spatial and quality.

Further, the bit stream may be constituted by layers which are the same in view, but different in spatial and quality. The spatial and quality layers may be classified into SD layers and HD layers and the SD layers and the HD layers may be again constituted by quality base layers and quality enhancement layers.

As illustrated, the respective layers are distinguished by identifiers (layer_id) in order to identify layers in which the spatial, the quality, and the view coexist. Information which layer (for example, the view layer, and the spatial and quality layer) each identifier is and each layer is an higher layer or a lower layer in layers is included in a video parameter set (VPS) or a sequence parameter set (SPS), a NAL unit header, and the like to be signaled.

As described above, when the inter-layer prediction is performed by using an inter-layer correlation, the higher layer is predicted by referring to at least one lower layer. Hereinafter, a layer in which a prediction is performed is called a target layer for easy description and a layer used or referred for predicting the target layer is expressed as a reference layer.

The present invention is used for efficient construction and management of a reference layer list considering encoding efficiency of spatial, quality, and view scalabilities in encoding blocks in the same slice by using one or more reference layers.

To this end, an object of the present invention is to improve the encoding efficiency by applying encoding and decoding methods which are suitable for a characteristic of each layer by separating and constructing a spatial and quality reference layer list to be referred at the same view as the target layer and a view reference layer list having the same spatial and quality layers as the target layer.

Generally, in the prediction between the pictures, at least one of a previous picture or a next picture of the current picture is referred to as a reference picture, and prediction for the current block may be preformed based on the reference picture. A picture used for the prediction of the current block is referred to as a reference picture or a reference frame.

A region in the reference picture may be specified by using a reference picture index refIdx indicating the reference picture, the motion vector, and the like.

In the prediction between the pictures, the prediction block for the current block is generated by selecting the reference picture and the reference block corresponding to the current picture in the reference picture.

In the prediction between the pictures, the encoding apparatus and the decoding apparatus derive motion information of the current block and then perform the prediction between the pictures and/or the motion compensation based on the derived motion information. In this case, the encoding apparatus and the decoding apparatus may improve the encoding/decoding efficiency by using motion information of a reconstructed neighboring block and/or a collocated block corresponding to a current block within an already reconstructed collocated picture.

Herein, the reconstructed neighboring block, as a block in the reconstructed current picture which is encoded and/or decoded, may include a block adjacent to the current block and/or a block positioned at an outer corner of the current block. Further, the encoding apparatus and the decoding apparatus may determine a predetermined relative position based on a block which is present at a position spatially corresponding to the current block within the collocated picture and derive the collocated block based on the determined predetermined relative position (internal and/or external positions of the block that is present at the position spatially corresponding to the current block). Herein, as an example, the collocated picture may correspond to one picture among reference pictures included in a reference picture list.

In the inter-picture prediction, the prediction block may be created so that a residual signal with the current block is minimized and the size of the motion vector is also minimized.

Meanwhile, a method of deriving the motion information may vary according to a prediction mode of the current block. The prediction mode applied for the inter prediction may include an advanced motion vector predictor (AMVP), a merge, and the like.

For example, in the case of applying the advanced motion vector predictor (AMVP), the encoding apparatus and the decoding apparatus may generate a prediction motion vector candidate list, by using the motion vector of the reconstructed neighboring block and/or the motion vector of the collocated block. That is, the motion vector of the reconstructed neighboring block and/or the motion vector of the collocated block may be used as a prediction motion vector candidate. The encoding apparatus may transmit a prediction motion vector index indicating an optimal prediction motion vector selected among the prediction motion vector candidates included in the list, to the decoding apparatus. In this case, the decoding apparatus may select the prediction motion vector of the current block among the prediction motion vector candidates included in the prediction motion vector candidate list, by using the prediction motion vector index.

The encoding apparatus may calculate a motion vector difference (MVD) between the motion vector of the current block and the prediction motion vector, and may code the motion vector difference (MVD) to transmit the coded motion vector difference (MVD) to the decoding apparatus. In this case, the decoding apparatus may decode the received motion vector difference, and may derive the motion vector of the current block through a sum of the decoded motion vector difference and the prediction motion vector.

The encoding apparatus may further transmit the reference picture index indicating the reference picture and the like to the decoding apparatus.

The decoding apparatus predicts the motion vector of the current block by using the motion information of the neighboring block, and may induce the motion vector of the current block by using the difference value with respect to the motion vector received from the encoding apparatus. The decoding apparatus may generate the prediction block for the current block based on the induced motion vector and the reference picture index information received from the encoding apparatus.

As another example, when the merge is applied, the encoding apparatus and the decoding apparatus may be create a merge candidate list by using the motion information of the neighboring block and/or the motion information of the collocated block. That is, when the motion information of the neighboring block and/or the collocated block which is reconstructed is present, the encoding apparatus and the decoding apparatus may use the motion information as a merge candidate for the current block.

The encoding apparatus may select a merge motion candidate which may provide optimal coding efficiency among the merge motion candidates included in the merge motion candidate list as the motion information for the current block. In this case, a merge index indicating the selected merge candidate is included in the bit stream to be transmitted to the decoding apparatus. The decoding apparatus may select one of merge candidates included in the merge motion candidate list by using the transmitted merge index, and may determine the selected merge candidate as the motion information of the current block. Accordingly, in the case where a merge mode is applied, the motion information of the reconstructed neighboring block and/or collocated block may be used as the motion information of the current block as it is. The decoding apparatus may reconstruct the current block by adding the prediction block to the residual transmitted from the encoding apparatus.

In the aforementioned AMVP and merge mode, the motion information of the reconstructed neighboring block and/or collocated block may be used in order to derive the motion information of the current block.

In the case of a skip mode which is one of other modes used in the prediction between the pictures, information of the neighboring block may be used in the current block as it is. Accordingly, in the case of the skip mode, the encoding apparatus does not transmit syntax information such as residual other than information indicating whether motion information of any block is used as the motion information of the current block.

The encoding apparatus and the decoding apparatus may create a prediction block of the current block by performing the motion compensation for the current block based on the derived motion information. Herein, the prediction block may mean a motion compensated block created by performing motion compensation for the current block. Further, a plurality of motion compensated blocks may constitute one motion compensated picture.

The decoding apparatus may verify a skip flag, a merge flag, and the like that received from the encoding apparatus and induce motion information required for the inter-prediction of the current block, for example, information regarding a motion vector, a reference picture index, and the like in response thereto.

A processing module in which the prediction is performed a processing module in which a prediction method and a detailed content are determined may be different from each other. For example, the prediction mode is determined by the prediction block unit and the prediction may be thus performed by the transformation block unit or the prediction mode is determined by the prediction block unit and the intra-picture prediction may be thus performed by the transformation block unit.

Figure 5:
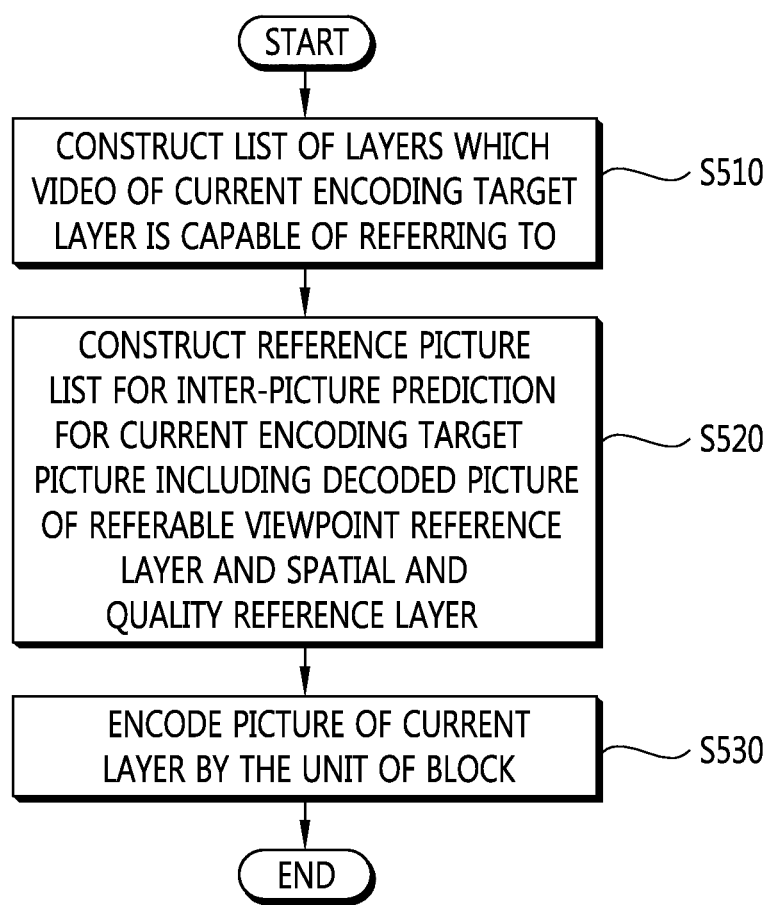
FIG. 5 is a control flowchart for describing a method of performing higher-layer encoding in an encoding apparatus according to an embodiment of the present invention.

FIG. 5 is a control flowchart for describing a method of performing upper-layer encoding in an encoding apparatus according to an embodiment of the present invention.

Hereinafter, referring to FIG. 5, in a video encoding method that supports one or more scalabilities (for example, spatial, quality, and view scalabilities) and uses a multi-layer structure, a method of encoding the higher layer, in more detail, a method that constitutes the reference layer list which the target layer may refer to will be described.

First, the encoding apparatus configures a list of layers which a picture of a current encoding target layer may refer to (S510).

The encoding apparatus configures a spatial and quality reference layer list including one or more spatial or quality layers which the current encoding target layer may refer to within the same view at the time of encoding the current encoding target layer among lower layers of the current encoding target layer and configure a view reference layer list including view layers which the target layer may refer to among layers having the same spatial and quality. The reference layer list may be configured according to at least one of methods described below.

Figure 6:
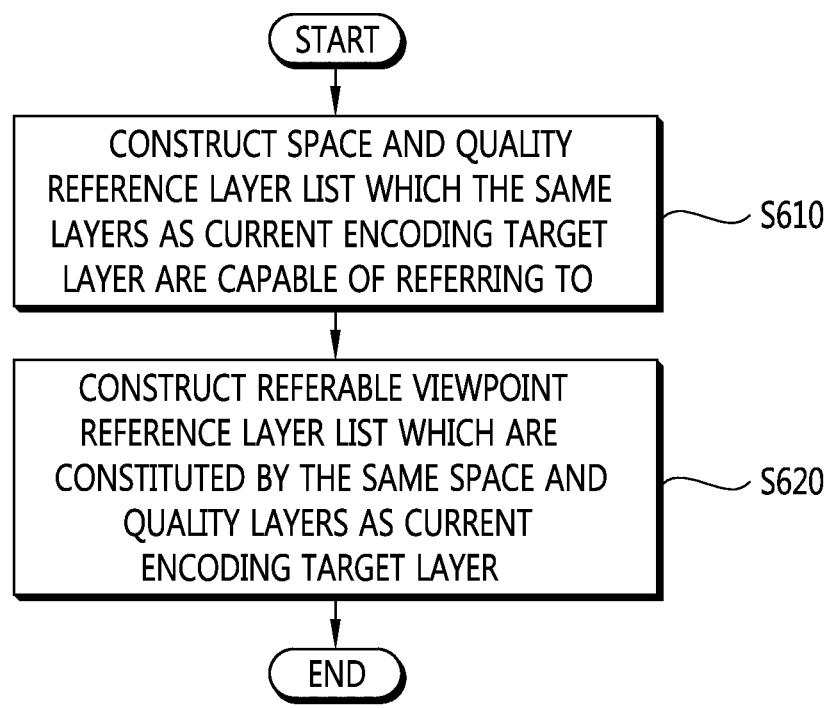
FIG. 6 is a control flowchart for describing a method of configuring a spatial and quality reference layer list and a view reference layer list in an encoding apparatus according to an embodiment of the present invention.

FIG. 6 is a control flowchart for describing a method of configuring a spatial and quality reference layer list and a view reference layer list in an encoding apparatus according to an embodiment of the present invention.

According to a first embodiment illustrated in FIG. 6, the encoding apparatus may first configure the spatial and quality reference layer list which the same layers as the current encoding target layer may refer to within the same view in entire bit stream (S610).

The encoding apparatus configures spatial and quality reference layers having the same view as the target layer in a predetermined order to create the referable spatial and quality reference layer list having the same view as the current encoding target layer.

Alternatively, the referable spatial and quality reference layer list having the same view as the current encoding target layer may be configured in an order of a layer (that is, a near layer) having a smaller difference between a layer_id value among the spatial and quality reference layers having the same view as the target layer and a layer_id value of the target layer to a layer having a larger difference.

Alternatively, the referable spatial and quality reference layer list having the same view as the current encoding target layer may be configured in an order of a layer having a higher priority to a layer having a lower priority among the spatial and quality reference layers having the same view as the target layer.

Information associated with the priority may be signaled, which is included in a NAL unit (NALU) header or a video parameter set.

Alternatively, the referable spatial and quality reference layer list having the same view as the current encoding target layer may be configured in an order of a layer having a smaller difference in spatial resolution from the current encoding target layer to a layer having a larger difference among the spatial and quality reference layers having the same view as the current encoding target. In this case, the quality reference layer order in the same spatial resolution may be an order of a layer (that is, a near layer) having a smaller difference from the layer_id of the current encoding target layer to a layer having a larger difference.

For example, a reference layer list in which the layer_id is n in the bit stream structure illustrated in FIG. 4 may be configured in an order of n−1, n−2, and n−3.

Alternatively, the referable spatial and quality reference layer list having the same view as the current encoding target layer may be configured in an order of a layer having a smaller difference in spatial resolution from the current encoding target layer to a layer having a larger difference among the spatial and quality reference layers having the same view as the current encoding target. In this case, the quality reference layer order in the same spatial resolution may be an order (that is, an order of a layer having a higher quality to a layer having a lower quality) of a layer having a lower value of a quantization parameter to be encoded to a layer having a higher value.

When the spatial and quality reference layer list which the same layer as the target layer may refer to is constructed, the encoding apparatus may configure the referable view reference layer list constituted by the same spatial and quality layers as the current encoding target layer by applying one of methods described below.

The encoding apparatus may construct the view reference layer list in which the view reference layers constituted by the same spatial and quality layers as the current encoding target layer are configured in a predetermined order.

Alternatively, the encoding apparatus may construct the view reference layer list in which the view reference layers constituted by the same spatial and quality layers as the current encoding target layer are configured in an order of a view nearer to a view further from the current encoding target view.

The spatial and quality reference layer lists and the view reference layer lists configured as above may be used to encode pictures which belong to the same layer as a layer to which the current encoding target picture belongs.

The spatial and quality reference layer list and the view reference layer list which the same layers (that is, layers having the same layer_id value) as the current encoding target layer may refer to are combined through efficient signaling to be described as one referable reference layer list.

Tables 1 and 2 illustrate an example in which the reference layer list and the view reference layer list are combined and signaled.

TABLE 1

| vps_extension( ){ | Descriptor |
|---|---|
| while||byte_aligned( ) ) | |
|   vps_extension_byte_ alignment_reserved_one_bit | u(1) |
| avc_base_codec_flag | u(1) |
| scalability_mask | u(15) |
| for(i=0; I<NumScalabilityTypes; i++){ | |
|   dimension_id_len_minus1[i] | u(3) |
| } | |
| vps _multi_layer_it_present_flag | u(1) |
| //layer specific information | |
| for(=1; i<=vps_max_layers_minus1; i++) { | |
|   // mapping of layer ID to scalability dimension IDs | |
|   if vps_muh_layer_id_present_flag ) | |
|     layer_id_in_num[i] | u(6) |
|   for(j=0; j<=num_dimensions_minus1;j++){ | |
|     dimension_id[i][j] | u(v) |
| } | |
|   for(i=1;i<=vps_max_layers_minus1;i++) | |
|     profile for level( 1,vps_max_sub_layers_minus1) | |
| for(i=1;1<=vps_max_layers_minus1;i++){ | |
|   //layer dependency | |
|   num_direct_ref_layers[i] | u(5) |
|   for(i=0;j<num direct ref layers[i];j++) | |
|     ref_layer_id[i][j] | u(6) |
| } | |
| } | |

Referring to Table 1, num_direct_ref_layers[i] represents the number of reference layers which an i-th layer (that is, a layer having layer_id of nuh_layer_id[i]) directly refers to.

ref_layer_id[i][j] represents layer_id of a j-th reference layer which the i-th layer refers to.

As illustrated in Table 1, the spatial and quality reference layer list and the view reference layer list may be signaled by describing reference layers, ref_layer_id, of layer having a value of layer_id_in_nuh[i] in the video parameter set.

TABLE 2

| vps_extensioni) { | Descriptor |
|---|---|
| while( !byte_aligned( ) ) | |
|   vps_extension_byte_alignment_reserved_one_bit | u(1) |
| avc_base_codec_flag | u(1) |
| scalability_mask | u(16) |
| for( i = 0; i <NumScalabilityTypes; i++){ | |
|   dimension_id_len_minus1[i] | u(3) |
| } | |

TABLE 2-continued

| vps_extensioni) { | Descriptor |
|---|---|
|   vps_nuh_layer_id_present_flag | u(1) |
|   //layer specific information | |
|   for( i = 1; i <= vps max layers minus1; i++) { | |
|   // mapping of layer ID to scalability dimension IDs | |
|   if( vps_nuh_layer_id_present_flag ) | |
|     nuh layer id [i] | u(6) |
|     for(j - 0; j <- num_dimensions_minus1;j++){ | |
|       dimension_id[i][j] | u(v) |
|   } | |
|   for( i=1; j <= vps_max_layers_minus1;i++) | |
|     profile_tier_level( 1, vps_max_sub_layers_minus1) | |
|   for(i=1;i<=vps_max_layers_minus1;i++){ | |
|   //layer dependency | |
|   for(j = 0, j < i j++) | |
|     direct_dependency_flag[i][j] | u(1) |
|   } | |
| } | |

Referring to Table 2, direct_dependency_flag[i][j] means that the i-th layer directly refers to the j-th reference layer when direct_dependency_flag[i][j] has a value of '1'. In other words, direct_dependency_flag[i][j] indicates whether the i-th layer (that is, the layer having layer_id of nuh_layer_id[i]) refers to the j-th reference layer (that is, a layer having layer_id of nuh_layer_id[j]).

The combined reference layer list may be signaled in a predetermined order or in an order of a value having the larger value of layer_id to a value having the smaller value of layer_id and the view reference layer list may be described subsequent to the spatial and quality reference layer list and the spatial and quality reference layer list may be described subsequent to the view reference layer list.

According to a second embodiment of configuring the list of the layers which the picture of the current encoding target layer may refer to, the encoding apparatus may configure the spatial and quality reference layer list and the view reference layer list which a current encoding target layer (alternatively, a corresponding slice) of a picture to be currently encoded may refer to.

The encoding apparatus may first configure the spatial and quality reference layer list which the current encoding target layer of the picture to be currently encoded may refer to by one of methods described below.

The encoding apparatus configures spatial and quality reference layers having the same view as the target layer in a predetermined order to construct the spatial and quality reference layer list which the current encoding target layer may refer to.

Alternatively, the encoding apparatus may construct the referable spatial and quality reference layer list having the same view as the current encoding target layer in an order of a layer (that is, a near layer) having a smaller difference between a layer_id value among the spatial and quality reference layers having the same view as the target layer and a layer_id value of the target layer to a layer having a larger difference.

Alternatively, the spatial and quality reference layer list may be configured in an order of a layer having a higher priority to a layer having a lower priority among the spatial and quality reference layers having the same view as the target layer.

In this case, information associated with the priority may be signaled, which is included in a NAL unit (NALU) header or a video parameter set.

Alternatively, the referable spatial and quality reference layer list having the same view as the current encoding target layer may be configured in an order of a layer having a smaller difference in spatial resolution from the current encoding target layer to a layer having a larger difference among the spatial and quality reference layers having the same view as the current encoding target. In this case, the quality reference layer order in the same spatial resolution may be an order of a layer (that is, a near layer) having a smaller difference from the layer_id of the current encoding target layer to a layer having a larger difference.

For example, a reference layer list in which the layer_id is n in the bit stream structure illustrated in FIG. 4 may be configured in an order of n−1, n−2, and n−3.

Alternatively, the referable spatial and quality reference layer list having the same view as the current encoding target layer may be configured in an order of a layer having a smaller difference in spatial resolution from the current encoding target layer to a layer having a larger difference in spatial resolution from the current encoding among the spatial and quality reference layers having the same view as the current encoding target. In this case, the quality reference layer order in the same spatial resolution may be an order (that is, an order of a layer having a higher quality to a layer having a lower quality) of a layer having a lower value of a quantization parameter to be encoded to a layer having a higher value.

When the spatial and quality reference layer list which the target layer may refer to is constructed, the referable view reference layer list constituted by the same spatial and quality layers as the current encoding target layer may be configured by applying one of methods described below.

The encoding apparatus may construct the view reference layer list in which the view reference layers constituted by the same spatial and quality layers as the current encoding target layer are configured in a predetermined order.

Alternatively, the encoding apparatus may construct the view reference layer list in which the view reference layers constituted by the same spatial and quality layers as the current encoding target layer are configured in an order of a view nearer to a view further from the current encoding target view.

The spatial and quality reference layer lists and the view reference layer lists configured as above may be used to encode the encoding target layer or the corresponding slice of the current encoding target picture.

The spatial and quality reference layer list and the view reference layer list which the same layers (that is, layers having the same layer_id value) as the current encoding target layer may refer to are combined through efficient signaling to be described as one referable reference layer list.

Tables 3 to 12 illustrate examples in which the spatial and quality reference layer list and the view reference layer list are combined and signaled.

For example, an encoder may encapsulate one of syntax elements of Tables 3 to 12 in a slider header and signal a description of reference layers therethrough.

In this case, layers which the described corresponding layer may refer to while encoding may be constituted by a sub-set of the reference layers which the same layers as the current encoding target layer may refer to in entire bit stream, that is, the reference layers signaled in the slice header may be constituted by some of the reference layers which the same layer as the current encoding target layer may refer to in entire the bit stream.

For example, the reference layers signaled to the slice header may be a sub-set of the reference layer list which the same layers as the current encoding target layer signaled in the video parameter set.

TABLE 3

| slice_segment_header( ) { | Descriptor |
|---|---|
| first_slice_segment_in_pic_flag | u(1) |
| ... | |
| if(nuh_layer_id>0 && NumDirectRefLayers[LayerIdInVps[nuh_layer_id]>0){ | |
| slice_num_direct_ref_layers | ue(v) |
| for( j = 0; j < slice_num_direct_ref_layers; j++ ) | |
| ref_layer_id_[[j] | u(6) |
| } | |
| ... | |
| } | |

Referring to Table 3, slice_num_direct_ref_layers represents the number of reference layers which a corresponding picture directly refers to. slice_num_direct_ref_layers needs to be equal to or smaller than the number of reference layers (that is, NumDirectRefLayers[LayerIdInVps[nuh_layer_id]) which layers having the same layer_id (that is, nuh_layer_id) as the corresponding picture signaled in the video parameter set.

ref_layer_id[j] represents layer_id of a j-th reference layer which the corresponding picture directly refers to.

TABLE 4

| slice_segment_header( ) { | Descriptor |
|---|---|
| first slice segment in pic flag | u(1) |
| ... | |
| if(nuh_layer_id>0 && NumDirectRefLayers[LayerIdInVps[nuh_layer_id]>0){ | |
| slice_num_direct_ref_layers | ue(v) |
| for( j = 0; j < slice_num_direct_ref_layers; j++ ) | |
| ref_layer_id_delta[j] | ue(v) |
| } | |
| ... | |
| } | |

Referring to Table 4, slice_num_direct_ref_layers represents the number of reference layers which the corresponding picture directly refers to. In this case, slice_num_direct_ref_layers needs to be equal to or smaller than the number of reference layers (that is, NumDirectRefLayers[LayerIdInVps[nuh_layer_id]) which layers having the same layer_id (that is, nuh_layer_id) as the corresponding picture signaled in the video parameter set.

ref_layer_id_delta[j] represents a difference between the layer_id of the j-th reference layer and a layer_id of a j−1-th reference layer which the corresponding picture directly refers to. In this case, as an index of a layer is closer to "0", a current picture may have a layer_id closer to the corresponding layer. ref_layer_id_delta[0] may represent a difference between a layer_id of a 0-th reference layer and a layer_id of a layer corresponding to the current picture.

TABLE 5

| slice_segment_header( ) { | Descriptor |
|---|---|
| first_slice_segment_in_pic_flag | u(1) |
| ... | |
| if(nuh_layer_id>0 && NumDirectRefLayers[LayerIdInVps[nuh_layer_id]>0){ | |
| slice_num_direct_ref_layers | ue(v) |
| for( j = 0; j < slice_num_direct_ref_layers; j++ ) | |
| ref_layer_idx_delta[j] | ue(v) |
| } | |
| ... | |
| } | |

Referring to Table 5, slice_num_direct_ref_layers represents the number of reference layers which the corresponding picture directly refers to. In this case, slice_num_direct_ref_layers needs to be equal to or smaller than the number of reference layers (that is, NumDirectRefLayers[LayerIdInVps[nuh_layer_id]) which layers having the same layer_id (that is, nuh_layer_id) as the corresponding picture signaled in the video parameter set.

ref_layer_idx_delta[j] may represent a difference between an index (based on an index described in vps) of the j-th reference layer and an index (based on the index described in vps) of the j−1-th reference layer which the corresponding picture directly refers to, and may represent an index of the 0-th reference layer.

TABLE 6

| slice_segment_header( ) { | Descriptor |
|---|---|
| first_slice_segment_in_pic_flag | u(1) |
| ... | |
| if(nuh_layer_id>0 && NumDirectRefLayers[LayerIdInVps[nuh_layer_id]>0){ | |
| slice_num_direct_ref_layers | ue(v) |
| for( j = 0; j < slice_num_direct_ref_layers; j++ ) | |
| ref_layer_idx j] | ue(v) |
| } | |
| ... | |
| } | |

Referring to Table 6, slice_num_direct_ref_layers represents the number of reference layers which a corresponding picture directly refers to. In this case, slice_num_direct_ref_layers needs to be equal to or smaller than the number of reference layers (that is, NumDirectRefLayers[LayerIdInVps[nuh_layer_id]) which layers having the same layer_id (that is, nuh_layer_id) as the corresponding picture signaled in the video parameter set.

ref_layer_idx[j] may represent the index (based on the index described in vps) of the j-th reference layer which the corresponding picture directly refers to.

TABLE 7

| slice_segment_header( ) { | Descriptor |
|---|---|
| first_slice_segment_in_pic_flag | u(1) |
| ... | |
| if(nuh_layer_id>0 && NumDirectRefLayers[LayerIdInVps[nuh_layer_id]>0){ | |
| slice num direc ref layers | ue(v) |
| if(slice_num_direct_ref_layers>0) | |
| for( j = 0; j < slice_num_direct_ref_layers; j++ ) | |
| ref_layer_id_delta[j] | ue(v) |
| } | |
| ... | |
| } | |

Referring to Table 7, slice_num_direct_ref_layers represents the number of reference layers which a corresponding picture directly refers to. In this case, slice_num_direct_ref_layers needs to be equal to or smaller than the number of reference layers (that is, NumDirectRefLayers[LayerIdInVps[nuh_layer_id]) which layers having the same layer_id (that is, nuh_layer_id) as the corresponding picture signaled in the video parameter set. When slice_num_direct_ref_layers is "0", the reference layer corresponding to the corresponding picture signaled in the video parameter set may be used as the reference layer of the current picture.

ref_layer_id_delta[j] represents a difference between the layer_id of the j-th reference layer and a layer_id of a j−1-th reference layer which the corresponding picture directly refers to. In this case, as the layer index is closer to "0", the current picture may have the layer_id closer to the corresponding layer. ref_layer_id_delta[0] may represent a difference between a layer_id of a 0-th reference layer and a layer_id of a layer corresponding to the current picture.

TABLE 8

| slice_segment_header( ) { | Descriptor |
|---|---|
|   first_slice_segment_in_pic_flag | u(1) |
|   ... | |
|   if(nuh_layer_id>0 && | |
|   NumDirectRefLayers[LayerIdInVps[nuh_layer_id]>0){ | |
|     slice_num_direct_ref_layers | ue(v) |
|     if(slice_num_direct_ref_layers>0) | |
|       for( j = 0; j < slice_num_direct_ref_layers; j++ ) | |
|         ref_layer_idx_delta[j] | ue(v) |
|   } | |
|   ... | |
| } | |

Referring to Table 8, slice_num_direct_ref_layers represents the number of reference layers which the corresponding picture directly refers to. In this case, slice_num_direct_ref_layers needs to be equal to or smaller than the number of reference layers (that is, NumDirectRefLayers[LayerIdInVps[nuh_layer_id]) which layers having the same layer_id (that is, nuh_layer_id) as the corresponding picture signaled in the video parameter set. When slice_num_direct_ref_layers is "0", the reference layer corresponding to the corresponding picture signaled in the video parameter set may be used as the reference layer of the current picture.

ref_layer_idx_delta[j] may represent a difference between an index (based on an index described in vps) of the j-th reference layer and an index (based on the index described in vps) of the j−1-th reference layer which the corresponding picture directly refers to. ref_layer_idx_delta[0] may represent the index of the 0-th reference layer.

TABLE 9

| slice_segment_header( ) { | Descriptor |
|---|---|
|   first_slice_segment_in_pic_flag | u(1) |
|   ... | |
|   if(nuh_layer_id>0 && | |
|   NumDirectRefLayers[LayerIdInVps[nuh_layer_id]>0){ | |
|     slice_num_direct_ref_layers | |
|     if(slice_num_direct_ref_layers>0) | ue(v) |
|       for( j = 0; j < slice_num_direct_ref_layers; j++ ) | |
|         ref_layer_idx j] | ue(v) |
|   } | |
|   ... | |
| } | |

Referring to Table 9, slice_num_direct_ref_layers represents the number of reference layers which the corresponding picture directly refers to. In this case, slice_num_direct_ref_layers needs to be equal to or smaller than the number of reference layers (that is, NumDirectRefLayers[LayerIdInVps[nuh_layer_id]) which layers having the same layer_id (that is, nuh_layer_id) as the corresponding picture signaled in the video parameter set. When slice_num_direct_ref_layers is "0", the reference layer corresponding to the corresponding picture signaled in the video parameter set may be used as the reference layer of the current picture.

ref_layer_idx[j] may represent the index (based on the index described in vps) of the j-th reference layer which the corresponding picture directly refers to.

TABLE 10

| slice_segment_header( ) { | Descriptor |
|---|---|
|   first_slice_segment_in_pic_flag | u(1) |
|   ... | |
|   if(nuh_layer_id>0 && | |
|   NumDirectRefLayers[LayerIdInVps[nuh_layer_id]>0){ | |
|     layer_dependency_sps_flag | u(1) |
|     if (layer_dependency_sps_flag){ | |
|       slice_num_direct_ref_layers | ue(v) |
|       for( j = 0; j < slice_num_direct_ref_layers; j++ ) | |
|         ref_layer_id_delta[j] | ue(v) |
|     } | |
|   } | |
|   ... | |
| } | |

Referring to Table 10, layer_dependency_sps_flag represents whether reference layer information is signaled by the slice header (slice segment header). When layer_dependency_sps_flag is "0", the reference layer information is signaled.

slice_num_direct_ref_layers represents the number of reference layers which the corresponding picture directly refers to. In this case, slice_num_direct_ref_layers needs to be equal to or smaller than the number of reference layers (that is, NumDirectRefLayers[LayerIdInVps[nuh_layer_id]]) which layers having the same layer_id (that is, nuh_layer_id) as the corresponding picture signaled in the video parameter set.

ref_layer_id_delta[j] represents a difference between the layer_id of the j-th reference layer and a layer_id of a j−1-th reference layer which the corresponding picture directly refers to. In this case, as an index of a layer is closer to "0", a current picture may have a layer_id closer to the corresponding layer. ref_layer_id_delta[0] may represent a difference between ref_layer_id[0] and the layer_id of the current picture.

TABLE 11

| slice_segment_header( ) { | Descriptor |
|---|---|
|   first_slice_segment_in_pic_flag | u(1) |
|   ... | |
|   if(nuh_layer_id>0 && | |
|   NumDirectRefLayers[LayerIdInVps[nuh_layer_id]>0){ | |
|     layer_dependency_sps_flag | u(1) |
|     if (layer_dependency_sps_flag){ | |
|       slice_num_direct_ref_layers | ue(v) |
|       for( j = 0; j < slice_num_direct_ref_layers; j++ ) | |
|         ref_layer_idx_delta[j] | ue(v) |
|     } | |
|   } | |
|   ... | |
| } | |

Referring to Table 11, layer_dependency_sps_flag represents whether reference layer information is signaled by the slice header (slice segment header). When layer_dependency_sps_flag is "0", the reference layer information is signaled.

slice_num_direct_ref_layers represents the number of reference layers which the corresponding picture directly refers to. In this case, slice_num_direct_ref_layers needs to be equal to or smaller than the number of reference layers (that is, NumDirectRefLayers[LayerIdInVps[nuh_layer_id]]) which layers having the same layer_id (that is, nuh_layer_id) as the corresponding picture signaled in the video parameter set.

ref_layer_idx_delta[j] may represent a difference between an index (based on an index described in vps) of the j-th reference layer and an index (based on the index described in vps) of the j−1-th reference layer which the corresponding picture directly refers to. ref_layer_idx_delta[0] may represent the index of the 0-th reference layer.

TABLE 12

| slice_segment_header( ) { | Descriptor |
|---|---|
| first_slice_segment_in_pic_flag | u(1) |
| ... | |
| if(nuh_layer_id>0 && | |
| NumDirectRefLayers[LayerIdInVps[nuh_layer_id]>0){ | |
|     layer_dependency_sps_flag | u(1) |
|     if (layer_dependency_sps_flag){ | |
|       slice num direct ref layers | ue(v) |
|       for( j = 0; j < slice_num_direct_ref_layers; j++ ) | |
|         ref_layer_idx j] | ue(v) |
|       } | |
|     } | |
| } | |
| ... | |
| } | |

Referring to Table 12, layer_dependency_sps_flag represents whether reference layer information is signaled by the slice header (slice segment header). When layer_dependency_sps_flag is "0", the reference layer information is signaled.

slice_num_direct_ref_layers represents the number of reference layers which the corresponding picture directly refers to. In this case, slice_num_direct_ref_layers needs to be equal to or smaller than the number of reference layers (that is, NumDirectRefLayers[LayerIdInVps[nuh_layer_id]]) which layers having the same layer_id (that is, nuh_layer_id) as the corresponding picture signaled in the video parameter set.

ref_layer_idx[j] represents the index (based on the index described in vps) of the j-th reference layer which the corresponding picture directly refers to.

The combined reference layer list may be signaled in a predetermined order or in an order of a value having the larger value of layer_id to a value having the smaller value of layer_id and the view reference layer list may be described subsequent to the spatial and quality reference layer list and the spatial and quality reference layer list may be described subsequent to the view reference layer list.

Referring back to FIG. 5, the encoding apparatus that configures the list of layers which the picture of the current encoding target layer may refer to constructs a reference picture list for an inter-picture prediction of the current encoding target picture including a decoded picture of the view reference layer which the target layer may refer to (S520).

The encoding apparatus may configure a reference picture set for an inter-picture prediction of the current encoding target picture which includes the decoded picture of the view reference layer and perform reference picture marking process.

In this case, the encoding apparatus verifies the picture included in the view reference layer list is available as a reconstructed picture and when the corresponding picture is available, the corresponding reconstructed picture is included in the reference picture set and when the corresponding picture is not available, the corresponding reconstructed picture may be expressed as "no reference picture".

A reference picture set (a first set) constituted by the pictures included in the view reference layer list is considered as "used for long term reference" to be treated as a long-term reference picture in the inter-picturepicture prediction of the current encoding target picture.

A reference picture set for the inter-picturepicture prediction, which is constituted by pictures on the same layer as the current encoding target layer other than the first set, that is, the reference picture set constituted by the picture included in the view reference layer list.

The reference picture set for the inter-picture prediction, which is constituted by pictures on the same layer as the current encoding target layer may be constituted by a short-term reference picture (second set) which is used for the inter-picture prediction of the current encoding target picture and is earlier than th current encoding target picture in a display order, a short-term reference picture (third set) which is used for the inter-picture prediction of the current encoding target picture and is later than the current encoding target picture in the display order, a long-term reference picture (fourth set) for the inter-picture prediction of the current encoding target picture, a short-term reference picture (fifth set) for a picture to be encoded after the current encoding target picture, and a long-term reference picture (sixth set) for the picture to be encoded after the current encoding target picture.

Further, the encoding apparatus may construct the reference picture list of the current encoding target picture according to a characteristic of the reference picture set and a reference picture type based on the various reference picture sets.

As one example, the encoding apparatus adds the reference picture sets constituted by the view reference layer list included in the first set to inter-picture reference picture lists L0 and L1 constituted by the reference picture sets constituted by the pictures on the same layer as the current encoding target picture to construct a final reference picture list.

In this case, the encoding apparatus may add a decoded picture on the view reference layer to a fixed position of the reference picture list when the reference picture list is constructed and additionally change the position of the decoded picture on the view reference layer after the construction of the reference picture list for efficient encoding.

When the decoded picture on the view reference layer is added to the fixed position of the reference picture list when the reference picture list is constructed, the first set may be added from a last, first (ref_idx=0), or second (ref_idx=1) position at the time of constructing the list L0.

When the view reference layer is added to an intermediate position of the list L0, an index in a list of pictures after the corresponding position may be increased by the number of view reference layers (the number of the reference picture sets constituted by the view reference layer list).

Alternatively, the encoding apparatus may substitute the first set for reference pictures as many as the reference picture sets constituted by the view reference layer list from the first (ref_idx=0) or second (ref_idx=1) position at the time of constructing the list L0.

The encoding apparatus may add the first set from a predetermined signaled position at the time of constructing the list L0. When the first set is added to the intermediate position of the list, an index in a list of pictures at the corresponding position and subsequent positionsmay be increased by the number of view reference layers (the number of reference picture sets constituted by the view reference layer lists).

Alternatively, the encoding apparatus may substitute the first set for the reference pictures as many as the reference picture sets constituted by the view reference layer lists from a predetermined signaled position at the time of constructing the list L0.

Alternatively, the encoding apparatus may add respective pictures included in the view reference layer list of the first set to predetermined different positions at the time of constructing the list L0. When the first set is added to the predetermined different positions of the list L0, an index in a list of pictures after the corresponding position may be increased by the number of view reference layers (the number of the reference picture sets constituted by the view reference layer list).

Alternatively, the encoding apparatus may substitute the respective pictures included in the view reference layer list of the first set for reference pictures at predetermined different positions at the time of constructing the list L0.

Alternatively, the encoding apparatus may add the first set to the last, first (ref_idx=0), or second (ref_idx=1) position at the time of constructing the list L0.

When the first set is added to the intermediate position of the list L1, an index in a list of pictures after the corresponding position may be increased by the number of view reference layers (the number of the reference picture sets constituted by the view reference layer list).

Alternatively, the encoding apparatus may substitute the first set for reference pictures as many as the reference picture sets constituted by the view reference layer list from the first (ref_idx=0) or second (ref_idx=1) position at the time of constructing the list L1.

The encoding apparatus may add the first set from a predetermined signaled position at the time of constructing the list L1. When the first set is added to the intermediate position of the list, an index in a list of pictures after the corresponding position may be increased by the number of view reference layers (the number of the reference picture sets constituted by the view reference layer list).

Alternatively, the encoding apparatus may substitute the first set for the reference pictures as many as the reference picture sets constituted by the view reference layer lists from a predetermined signaled position at the time of constructing the list L1.

Alternatively, the encoding apparatus may add the respective pictures included in the view reference layer list of the first set to predetermined different positions at the time of constructing the list L1. When the first set is added to the predetermined different positions of the list L1, an index in a list of pictures after the corresponding position may be increased by the number of view reference layers (the number of the reference picture sets constituted by the view reference layer list).

Alternatively, the encoding apparatus may substitute the respective pictures included in the view reference layer list of the first set for reference pictures at predetermined different positions at the time of constructing the list L1.

Meanwhile, when the reference picture list is constructed and thereafter, the position of the decoded picture on the view reference layer is additionally changed for efficient encoding, the position of the decoded picture on the view reference layer may be changed to any position of the reference picture list by using an encoding parameter which may be included in the slice header or the picture parameter set.

When the reference layer list is constructed, the encoding apparatus may encode a picture on a current layer by the unit of a block (S530).

The encoding apparatus may encode a target block by using the inter-picture prediction including the decoded picture on a spatial and quality reference layer or a view reference layer which an encoding target block on the current layer may refer to.

As one example, the encoding apparatus may perform encoding by using at least one of a plurality of pieces of information on the reference blocks of the referable spatial and quality reference layer. In this case, the reference block of the reference layer may mean, for example, a block at the same position as the current encoding target block as a block of the reference block corresponding to the current encoding target block of the current layer.

The encoding apparatus may select one reference layer in the spatial and quality reference layer list which the encoding target block of the current layer may refer to and may encode the encoding target block of the current layer by using any one or at least one of a reconstruction pixel value of the reference block, a residual of the reference block, and the encoding parameter of the reference block, for example, a reference frame, a motion vector prediction mode, and block partitioning information in the information on the reference block of the reference layer.

When the information on the reference layer included in the reference layer list is used at the time of encoding the encoding target block, the encoding apparatus may encode an index representing a used reference layer.

For example, when the layer_id of the layer included in the spatial and quality reference layer list which the layer in which the layer_id of FIG. 4 is n refers to is n−1 and n−2, the layer in which the layer_id is n−1 is indexed to 0 of the reference layer list, and the layer in which the layer_id is n−2 is indexed to 1 of the reference layer list, the index "1" of the spatial and quality reference layer list is encoded to be signaled in the case where the current encoding target block refers to the reference layer in which the layer_id is n−2.

In this case, the used spatial and quality reference layer list may be configured from the reference layer list which the current encoding target layer signaled in the slice header refers to. If the reference layer list is not signaled in the slice header, the spatial and quality reference layer list may be constituted from reference layers which the same layers as the current encoding target layer in entire bit stream signaled in the video parameter set.

According to another example, the encoding apparatus may perform a motion estimation and a motion compensation for the current encoding target block by using the reference picture within the reference picture list when the current encoding target block performs the inter-picture prediction.

According to the embodiment, the encoding apparatus may perform the motion estimation and the motion compensation for the current encoding target by a general inter-picture prediction method by using the reference picture within the reference picture list including the decoded picture of the view reference layer created in step S520.

According to the present invention referring to FIG. 5, the interlayer prediction may be performed by considering a characteristic of each layer by separating the spatial and quality reference layer list constituted by spatial and quality layers to be referred at the same time as a target layer and a view reference layer list constituted by the same spatial and quality layers as the target layer in encoding and decoding encoding and decoding pictures of an higher layer to improve the encoding efficiency.

Figure 7:
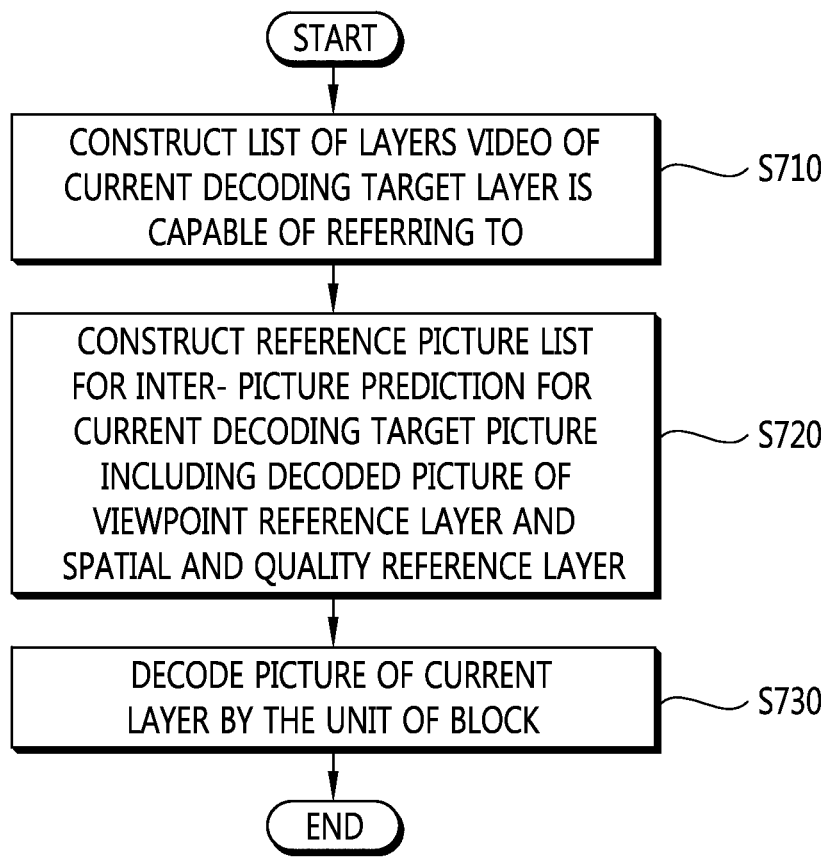
FIG. 7 is a control flowchart for describing a method of performing higher-layer decoding in a decoding apparatus according to an embodiment of the present invention.

FIG. 7 is a control flowchart for describing a method of performing higher-layer decoding in a decoding apparatus according to an embodiment of the present invention. The decoding apparatus according to the present invention supports one or more scalabilities (for example, spatial, quality, and view scalabilities) and performs decoding of the higher layer in a video structure supporting a multi-layer structure.

Referring to FIG. 7, the decoding apparatus configures a list of layers which a picture of a current decoding target layer may refer to (S710). The list of the layers which the picture of the current decoding target layer may be constructed by inducing a spatial and quality reference layer list and a view reference layer list which the same layers as the current decoding target layer or a list of layers which the picture of the current decoding target layer refers to in entire bit stream.

The decoding apparatus according to the embodiment of the present invention may configure the spatial and quality reference layer list and a view reference layer list which the same layers as the current decoding target layer in entire bit stream refer to and the reference layer lists configured as above may be used to decode pictures which belong to the same layer as the picture of the current decoding target picture.

Figure 8:
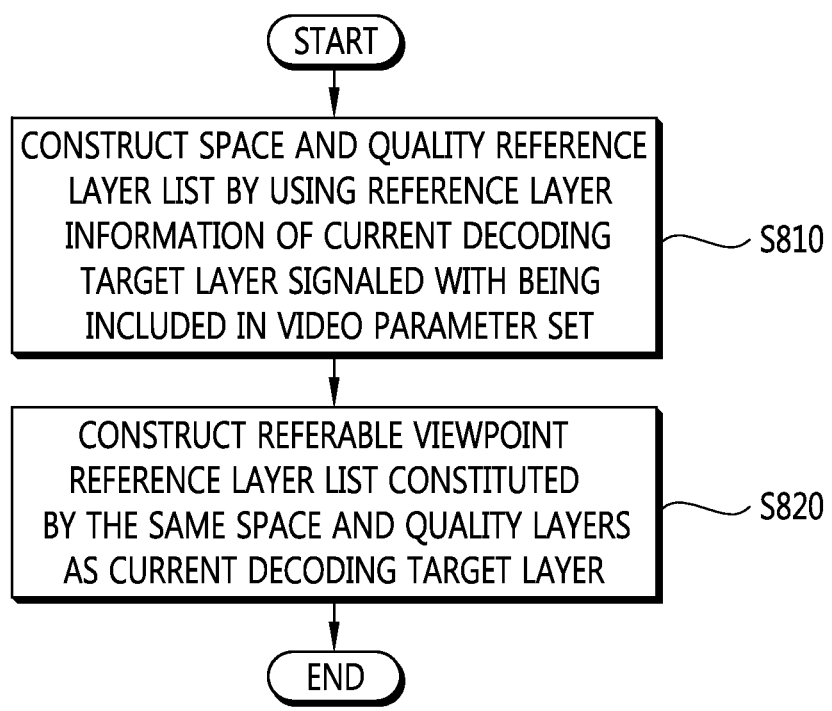
FIG. 8 is a control flowchart for describing a method of configuring a spatial and quality reference layer list and a view reference layer list in a decoding apparatus according to an embodiment of the present invention.

FIG. 8 is a control flowchart for describing a method of configuring a spatial and quality reference layer list and a view reference layer list in a decoding apparatus according to an embodiment of the present invention.

First, the decoding apparatus may configure the spatial and quality reference layer list by using reference layer information of the current decoding target layer included in and signaled to a video parameter set (S810).

For example, the decoding apparatus may constitute the spatial and quality reference layer list having the same view as the current decoding target with spatial and quality reference layers having the same view as the current decoding target among the reference layers, ref_layer_id, of a layer having a value of layer_id_in_nuh[i], as illustrated in Table 1.

According to yet another example, the decoding apparatus may constitute the spatial and quality reference layer list with the spatial and quality reference layers having the same view as the current decoding target among reference layers of a layer having a value of nuh_layer_id signaled as illustrated in Table 2.

An order of the layers may be variously set in configuring the spatial and quality reference layer list.

For example, the decoding apparatus may construct the referable spatial and quality reference layer list having the same view as the current decoding target layer in an order of a layer (that is, a near layer) having a smaller difference between a layer_id value among the spatial and quality reference layers having the same view as the current decoding target layer and a layer_id value of the decoding target layer to a layer having a larger difference.

Alternatively, the decoding apparatus may configure the spatial and quality reference layer list in an order of a layer having a higher priority to a layer having a lower priority among the spatial and quality reference layers having the same view as the current decoding target layer.

In this case, information on the priority may be signaled in the NAL unit header or video parameter set.

Alternatively, the decoding apparatus may configure the spatial and quality reference layer list in an order of a layer having a smaller difference in spatial resolution to a layer having a larger difference among the spatial and quality reference layers having the same view as the current decoding target layer.

In this case, the quality reference layer order in the same spatial resolution may be configured in an order of a layer (that is, a near layer) having a smaller difference from the layer_id of the current decoding target layer to a layer having a larger difference.

For example, a reference layer list in which the layer_id is n in the bit stream structure illustrated in FIG. 4 may be configured in an order of n−1, n−2, and n−3.

Alternatively, the referable spatial and quality reference layer list having the same view as the current decoding target layer may be configured in an order of a layer having a smaller difference in spatial resolution from the current decoding target layer to a layer having a larger difference among the spatial and quality reference layers having the same view as the current decoding target. In this case, the quality reference layer order in the same spatial resolution may be an order (that is, an order of a layer having a higher quality to a layer having a lower quality) of a layer having a lower value of a quantization parameter to be decoded to a layer having a higher value.

When the spatial and quality reference layer list which the same layers as the target layer may refer to is constructed, the decoding apparatus may configure a referable view reference layer list constituted by the same spatial and quality layers as the current decoding target layer by using the reference layer information of the current decoding target layer included in and signaled to the video parameter set (S820).

For example, the decoding apparatus may constitute the reference layer list with layers of the current encoding target layer, which have different views among the layers having the same spatial and quality as the current decoding target among the reference layers, ref_layer_id, of the layer having the value of layer_id_in_nuh[i] signaled as illustrated in Table 1.

According to yet another example, the decoding apparatus may constitute the view reference layer list with the layers of the current encoding target layer, which have different views among the layers having the same spatial and quality as the current decoding target layer among the reference layers of the layer having the value of nuh_layer_id signaled as illustrated in Table 2.

The encoding apparatus may construct the view reference layer list in an order in which the view reference layers constituted by the same spatial and quality layers as the current encoding target layer are signaled.

Alternatively, the decoding apparatus may construct the view reference layer list in which the view reference layers constituted by the same spatial and quality layers as the current decoding target layer are configured in an order of a view nearer to a view further from the current decoding target view.

According to another embodiment of the present invention, the decoding apparatus may configure a spatial and quality reference layer list and a view reference layer list which a current encoding target layer (alternatively, a corresponding slice) of a picture to be currently encoded may refer to, and the configured reference layer lists may be used to decode the current decoding target picture.

The decoding apparatus may configure the spatial and quality reference layer list and the view reference layer list by using the reference layer information signaled in the slice header of the current decoding target layer.

In the case of the decoding apparatus, even when the current decoding target picture is divided into one or more slices, the reference layer information signaled in the slice header may be same.

The decoding apparatus may first configure the spatial and quality reference layer list which the current encoding target layer of the picture to be currently encoded may refer to by one of methods described below.

For example, the spatial and quality reference layer list may be constituted by the spatial and quality reference layers having the same view as the current decoding target among the reference layers signaled in the slice header by using one of the methods illustrated in Tables 3 to 12.

The reference layers signaled in the slice header may be a sub-set of reference layers which the same layers as the current decoding target layer may refer to in entire bit stream.

For example, the reference layers signaled to the slice header may be a sub-set of the reference layer list which the same layers as the current decoding target layer signaled in the video parameter set.

In this case, the decoding apparatus may configure the spatial and quality reference layer list in various layer orders.

As one example, the decoding apparatus may construct the referable spatial and quality reference layer list having the same view as the current encoding target layer in an order of a layer (that is, a near layer) having a smaller difference between a layer_id value among the spatial and quality reference layers having the same view as the current decoding target layer and a layer_id value of the decoding target layer to a layer having a larger difference.

Alternatively, the spatial and quality reference layer list may be configured in an order of a layer having a higher priority to a layer having a lower priority among the spatial and quality reference layers having the same view as the target layer.

In this case, information associated with the priority may be signaled, which is included in a NAL unit (NALU) header or a video parameter set.

Alternatively, the referable spatial and quality reference layer list having the same view as the current decoding target layer may be configured in an order of a layer having a smaller difference in spatial resolution from the current decoding target layer to a layer having a larger difference among the spatial and quality reference layers having the same view as the current encoding target. In this case, the quality reference layer order in the same spatial resolution may be an order of a layer (that is, a near layer) having a smaller difference from the layer_id of the current decoding target layer to a layer having a larger difference.

For example, a reference layer list in which the layer_id is n in the bit stream structure illustrated in FIG. 4 may be configured in an order of n−1, n−2, and n−3.

Alternatively, the referable spatial and quality reference layer list having the same view as the current decoding target layer may be configured in an order of a layer having a smaller difference in spatial resolution from the current decoding target layer to a layer having a larger difference among the spatial and quality reference layers having the same view as the current decoding target. In this case, the quality reference layer order in the same spatial resolution may be an order (that is, an order of a layer having a higher quality to a layer having a lower quality) of a layer having a lower value of a quantization parameter to be decoded to a layer having a higher value.

When the spatial and quality reference layer list which the same layer as the target layer may refer to is constructed, the decoding apparatus may configure the referable view reference layer list constituted by the same spatial and quality layers as the current decoding target layer.

For example, the decoding apparatus may constitute the reference layer list with layers having a different view from the current decoding target layer among the layers having the same spatial and quality as the current decoding target among the reference layers signaled in the slice header by using one of the methods illustrated in Tables 3 to 12.

The encoding apparatus may construct the view reference layer list in an order in which the view reference layers constituted by the same spatial and quality layers as the current encoding target layer are signaled.

Alternatively, the decoding apparatus may construct the view reference layer list in which the view reference layers constituted by the same spatial and quality layers as the current decoding target layer are configured in an order of a view nearer to a view further from the current decoding target view.

The number of layers which may be referred maximally may be limited with respect to entire bit stream and the corresponding number may be signaled in the video parameter set, a sequence parameter set, or the slice header, and may be limited according to a profile and a level.

When additional signaling (for example, signal at a higher level such as the slice header) is given to the configured reference layer list, an order may be changed in the list depending on a content expressed in the signaling.

Next, the decoding apparatus constructs a reference picture list for an inter-picture prediction of a current decoding target picture including a decoded picture of a view reference layer (S720).

The decoding apparatus may configure a reference picture set for an inter-picture prediction of the current decoding target picture which includes the decoded picture of the view reference layer and perform reference picture marking process.

That is, the decoding apparatus configures the reference picture set (first set) constituted by the pictures included in the view reference layer list. In this case, the decoding apparatus verifies the picture included in the view reference layer list is available as a reconstructed picture and when the corresponding picture is available, the corresponding reconstructed picture is included in the reference picture set and when the corresponding picture is not available, the corresponding reconstructed picture may be considered as "no reference picture".

The reference picture set constituted by the pictures included in the view reference layer list is considered as "used for long term reference" to be treated as a long-term reference picture at the time of the inter-picture prediction of the current decoding target picture.

The decoding apparatus may configure various reference picture sets for the inter-picture prediction, which are constituted by the pictures on the same layer as the current decoding target layer and are various as below other than the first set, that is, the reference picture set constituted by the pictures included in the view reference layer list.

The reference picture sets may be one of a short-term reference picture (second set) which is used for the inter-picture prediction of the current decoding target picture and is earlier than the current decoding target picture in a display order, a short-term reference picture (third set) which is used for the inter-picture prediction of the current decoding target picture and is later than the current decoding target picture in the display order, a long-term reference picture (fourth set) for the inter-picture prediction of the current decoding target picture, a short-term reference picture (fifth set) for a picture to be decoded after the current decoding target picture, and a long-term reference picture (sixth set) for the picture to be decoded after the current decoding target picture.

The decoding apparatus may construct the reference picture list of the current decoding target picture according to the reference picture set and the reference picture type. That is, the decoding apparatus may construct the reference picture list by combining the first set, and the second to fourth sets.

For example, the decoding apparatus may construct a final reference picture list by adding the reference picture set constituted by the view reference layer lists included in the first set to inter-picture reference picture lists L0 and L1 constituted by reference picture sets constituted by pictures on the same layer as the current decoding target picture in constructing the reference picture list of the current decoding target picture.

In this case, the decoding apparatus may add a decoded picture on the view reference layer to a fixed position of the reference picture list when the reference picture list is constructed and change the position of the decoded picture on the view reference layer for efficient encoding. When the decoded picture on the view reference layer is added to the fixed position of the reference picture list when the reference picture list is constructed, the first set may be added from a last, first (ref_idx=0), or second (ref_idx=1) position at the time of constructing the list L0.

When the first set is added to the intermediate position of the list L0, an index in a list of pictures after the corresponding position may be increased by the number of view reference layers (the number of the reference picture sets constituted by the view reference layer list).

Alternatively, the decoding apparatus may substitute the first set for reference pictures as many as the reference picture sets constituted by the view reference layer list from the first (ref_idx=0) or second (ref_idx=1) position at the time of constructing the list L0.

Alternatively, the decoding apparatus may add the first set from a predetermined signaled position at the time of constructing the list L0. When the first set is added to the intermediate position of the list, an index in a list of pictures after the corresponding position may be increased by the number of view reference layers (the number of the reference picture sets constituted by the view reference layer list).

Alternatively, the decoding apparatus may substitute the first set for the reference pictures as many as the reference picture sets constituted by the view reference layer lists from a predetermined signaled position at the time of constructing the list L0.

Alternatively, the decoding apparatus may add the respective pictures included in the view reference layer list of the first set to predetermined different positions at the time of constructing the list L0. When the first set is added to the predetermined different positions of the list L0, an index in a list of pictures after the corresponding position may be increased by the number of view reference layers (the number of the reference picture sets constituted by the view reference layer list).

Alternatively, the decoding apparatus may substitute the respective pictures included in the view reference layer list of the first set for reference pictures at predetermined different positions at the time of constructing the list L0.

Alternatively, the decoding apparatus may add the first set to the last, first (ref_idx=0), or second (ref_idx=1) position at the time of constructing the list L1.

When the view reference layer is added to the intermediate position of the list L1, an index in a list of pictures after the corresponding position may be increased by the number of view reference layers (the number of the reference picture sets constituted by the view reference layer list)

Alternatively, the decoding apparatus may substitute the first set for reference pictures as many as the reference picture sets constituted by the view reference layer list from the first (ref_idx=0) or second (ref_idx=1) position at the time of constructing the list L1.

Alternatively, the decoding apparatus may add the first set from a predetermined signaled position at the time of constructing the list L1. When the first set is added to the intermediate position of the list L1, an index in a list of pictures after the corresponding position may be increased by the number of view reference layers (the number of the reference picture sets constituted by the view reference layer list).

Alternatively, the decoding apparatus may substitute the first set for the reference pictures as many as the reference picture sets constituted by the view reference layer lists from a predetermined signaled position at the time of constructing the list L1.

Alternatively, the decoding apparatus may add the respective pictures included in the view reference layer list of the first set to predetermined different positions at the time of constructing the list L1. When the first set is added to the predetermined different positions of the list L1, an index in a list of pictures after the corresponding position may be increased by the number of view reference layers (the number of the reference picture sets constituted by the view reference layer list).

Alternatively, the decoding apparatus may substitute the respective pictures included in the view reference layer list of the first set for reference pictures at predetermined different positions at the time of constructing the list L1.

Meanwhile, when the reference picture list is constructed and thereafter, the position of the decoded on the view reference layer is additionally changed for efficient encoding, the position of the decoded picture on the view reference layer may be changed to any position of the reference picture list by using an encoding parameter which may be included in the slice header or the picture parameter set.

When the reference layer list is constructed, the decoding apparatus may decode the picture of the current layer by the unit of the block (S730).

When the current decoding target block of the current layer refers to the spatial and quality reference layer, the corresponding picture may be decoded as described below.

As one example, the decoding apparatus may determine the reference layer used in decoding the current decoding target block in the spatial and quality reference layer list used in the current decoding target picture and determine a reference block of the corresponding reference layer.

In this case, the used spatial and quality reference layer list may be configured from the reference layer list which the current decoding target layer signaled in the slice header refers to. If the reference layer list is not signaled in the slice header, the spatial and quality reference layer list may be constituted from reference layers which the same layers as the current decoding target layer in entirebit stream signaled in the picture parameter set.

The decoding apparatus may determine the spatial and quality reference layer according to an index representing the spatial and quality reference layer signaled by the unit of the decoding target block.

When the spatial and quality reference layer is determined, the decoding apparatus may determine the reference block corresponding to the current decoding target block in the determined spatial and quality reference layer.

The reference block of the reference layer may mean a block of the reference layer corresponding to the current decoding target block and for example, mean a block that is present at the same position as the current decoding target block on the reference layer.

For example, in determining the spatial and quality reference layer corresponding to the decoding target block of the layer in which the layer_id is n in FIG. 4, a picture in which the layer_id is n−1 and the layer_id is n−2 is included in the spatial and quality reference layer list in which the layer_id is n at view 1 and when the spatial and quality reference layer index of the current decoding target block is "1", the current decoding target block may set the layer in which the layer_id is n−2 as the spatial and quality reference layer and determine the reference block corresponding to the current decoding target block on the spatial and quality reference layer.

Then, the decoding apparatus may decode the target block by using at least one of the reconstruction pixel value of the reference block, the residual of the reference block, and encoding parameters of the reference block (for example, the reference frame, the motion vector, the prediction mode, the block partitioning information, and the like) among the information on the reference block of the selected spatial and quality reference layer.

Meanwhile, when the current decoding target block of the current layer performs the inter-picture prediction, the decoding apparatus may perform the motion compensation for the current decoding target block by using the reference picture within the reference picture list.

In this case, the decoding apparatus may perform the motion compensation for the current decoding target picture by the general inter-picture prediction method by using the reference picture within the reference picture list including the decoded picture of the view reference layer created in step S720.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

The aforementioned embodiments include examples of various aspects. All available combinations for expressing various aspects cannot be described, but it can be recognized by those skilled in the art that other combinations can be used. Therefore, all other substitutions, modifications, and changes of the present invention that belong to the appended claims can be made.

What is claimed is:

1. A video decoding method supporting layers, the method comprising:
   constructing a reference layer list comprising a view reference layer list, wherein the view reference layer list comprises one or more view reference layers determined based on information included in a slice header, wherein a picture of a target layer as a current decoding target refers to the reference layer list;
   constructing, based on the constructed reference layer list, a reference picture list comprising either one or both of a decoded picture of a view reference layer and a decoded picture of a spatial and quality reference layer; and
   predicting and decoding the picture of the target layer by a unit of a block by referring to the reference picture list,
   wherein the decoded picture of the view reference layer included in the reference picture list is treated as a long-term reference picture,
   wherein the information included in the slice header comprises at least one layer identifier of at least one picture that may be referenced by the picture of the target layer, and
   wherein the constructing of the reference picture list comprises
   configuring a first set comprising the decoded picture of the view reference layer,
   configuring a second set comprising pictures on a same layer as the picture of the target layer, and
   combining the first set and the second set.

2. The method of claim 1, wherein the constructing of the reference layer list comprises constructing a spatial and quality reference layer list, and the view reference layer list in all bitstreams, and
   the target layer is capable of referring to layers of the spatial and quality reference layer list during the decoding.

3. The method of claim 2, wherein the layers of the spatial and quality reference layer list comprise layers having the same view as the target layer.

4. The method of claim 2, wherein the layers of the view reference layer list comprise layers having the same spatial features and quality as the target layer.

5. The method of claim 1, wherein a picture in the first set is the long-term reference picture.

6. The method of claim 1, wherein the pictures in the first set are added to any one of a first, second, and last lists of the reference picture list.

7. The method of claim 1, wherein the spatial and quality reference layer is referred to during the predicting and decoding of the picture by the unit of the block, and
   the predicting and decoding of the picture by the unit of the block further comprises
   determining a reference layer used to decode a current decoding target block in a spatial and quality reference layer list,
   determining a reference block corresponding to the target block in the determined spatial and quality reference layer, and
   decoding the target block by using at least one of a reconstruction pixel value of the reference block, a residual of the reference block, or encoding parameters of the reference block.

8. The method of claim 1, wherein in the predicting and decoding of the picture by the unit of the block, the inter-picture prediction for the current decoding target block is performed by using the reference picture within the reference picture list.

9. A video decoding apparatus supporting layers, the apparatus comprising:

an entropy-decoding module configured to decode information to predict and decode a picture received through a bit stream; and a prediction module configured to construct a reference layer list comprising a view reference layer list, wherein the view reference layer list comprises one or more view reference layers determined based on information included in a slice header, wherein a picture of a target layer as a current decoding target refers to the reference layer list, construct, based on the constructed reference layer list, a reference picture list comprising either one or both of a decoded picture of a view reference layer and a decoded picture of a spatial and quality reference layer, and predict and decode the picture of the target layer by referring to the reference picture list, wherein the decoded picture of the view reference layer included in the reference picture list is treated as a long-term reference picture, wherein the information included in the slice header comprises at least one layer identifier of at least one picture that may be referenced by the picture of the target layer, and wherein the prediction module is further configured to configure a first set comprising the decoded picture of the view reference layer, configure a second set comprising pictures on a same layer as the picture of the target layer, and combine the first set and the second set to construct the reference picture list.

10. The apparatus of claim 9, wherein the prediction module is configured to construct a spatial and quality reference layer list, and the view reference layer list in all bitstreams, and the target layer is capable of referring to layers of the spatial and quality reference layer list during the decoding.

11. The apparatus of claim 9, wherein the layers of the spatial and quality reference layer list comprise layers having the same view as the target layer.

12. The apparatus of claim 9, wherein the layers of the view reference layer list comprise layers having the same spatial features and quality as the target layer.

13. The apparatus of claim 9, wherein a picture formed in the first set is the long-term reference picture.

14. The apparatus of claim 9, wherein the pictures in the first set are added to any one of a first, second, and last lists of the reference picture list.

15. The apparatus of claim 9, wherein the picture of the target layer is capable of being predicted by the spatial and quality reference layer, and the prediction module is configured to determine a reference layer used to decode a current decoding target block in a spatial and quality reference layer list, determine a reference block corresponding to the target block in the determined spatial and quality reference layer, and decode the target block by using at least one of a reconstruction pixel value of the reference block, a residual of the reference block, or encoding parameters of the reference block.

16. The apparatus of claim 9, wherein the prediction module is configured to perform the inter-picture prediction for the current decoding target block by using a reference picture within the reference picture list.

17. A video encoding apparatus supporting layers, the apparatus comprising:

a processor configured to predict and encode a picture of a target layer by referring to one or more reference pictures, construct a reference layer list comprising a view reference layer list, wherein the view reference layer list comprises one or more view reference layers, and wherein information on the one or more view reference layers is encoded and included in a slice header, and construct, based on the constructed reference layer list, a reference picture list comprising either one or both of a decoded picture of a view reference layer and a decoded picture of a spatial and quality reference layer, wherein the decoded picture of the view reference layer included in the reference picture list is treated as a long-term reference picture, wherein the information included in the slice header comprises at least one layer identifier of at least one picture that may be referenced by the picture of the target layer, and wherein the processor is further configured to configure a first set comprising the decoded picture of the view reference layer, configure a second set comprising pictures on a same layer as the picture of the target layer, and combine the first set and the second set to construct the reference picture list.

18. A non-transitory computer-readable medium storing a bitstream, wherein the bitstream is generated by a video encoding method, the method comprising:

predicting and encoding a picture of a target layer by referring to one or more reference pictures;

constructing a reference layer list comprising a view reference layer list, wherein the view reference layer list comprises one or more view reference layers, and wherein information on the one or more view reference layers is encoded and included in a slice header; and constructing, based on the constructed reference layer list, a reference picture list comprising either one or both of a decoded picture of a view reference layer and a decoded picture of a spatial and quality reference layer, wherein the decoded picture of the view reference layer included in the reference picture list is treated as a long-term reference picture, and wherein the information included in the slice header comprises at least one layer identifier of at least one picture that may be referenced by the picture of the target layer and wherein the constructing of the reference picture list comprises configuring a first set comprising the decoded picture of the view reference layer, configuring a second set comprising pictures on a same layer as the picture of the target layer, and combining the first set and the second set.

19. A non-transitory computer-readable medium storing a bitstream that is generated by encoding a video, the bitstream comprising:

information on one or more view reference layers in a slice header, the information being used to determine one or more view reference layers, the one or more view reference layers being comprised in a view reference layer list, the view reference layer list being used to construct a reference layer list by being comprised in the reference layer list, a picture of the target layer as a current decoding target referring to the reference layer list, a reference picture list being constructed based on the constructed reference layer list, the reference picture list comprising either one or both of a decoded picture of a view reference layer and a decoded picture of a spatial and quality reference layer, the reference picture list being referred to when predicting and decoding the picture of the target layer by a unit of a block, the decoded picture of the view reference layer being included in the reference picture list is treated as a long-term reference picture, the information included in the slice header comprising at least one layer identifier of at least one picture that may be referenced by the picture of the target layer and the constructing of the reference picture list comprises configuring a first set comprising the decoded picture of the view reference layer, configuring a second set comprising pictures on a same layer as the picture of the target layer, and combining the first set and the second set.

* * * * *